(12) United States Patent  (10) Patent No.: US 9,141,131 B2
Felch  (45) Date of Patent: Sep. 22, 2015

(54) METHODS AND SYSTEMS FOR PERFORMING EXPONENTIATION IN A PARALLEL PROCESSING ENVIRONMENT

(75) Inventor: Andrew C. Felch, Palo Alto, CA (US)

(73) Assignee: Cognitive Electronics, Inc., Boston, MA (US)

( * ) Notice: Subject to any disclaimer, the term of this patent is extended or adjusted under 35 U.S.C. 154(b) by 189 days.

(21) Appl. No.: 13/594,166

(22) Filed: Aug. 24, 2012

(65) Prior Publication Data

US 2013/0054665 A1 Feb. 28, 2013

Related U.S. Application Data

(60) Provisional application No. 61/528,074, filed on Aug. 26, 2011.

(51) Int. Cl.
*G06F 7/552* (2006.01)
*G06F 1/03* (2006.01)
*G06F 1/035* (2006.01)

(52) U.S. Cl.
CPC ............ *G06F 1/0307* (2013.01); *G06F 1/0356* (2013.01); *G06F 7/552* (2013.01)

(58) Field of Classification Search
USPC ................................. 708/277, 606
See application file for complete search history.

(56) References Cited

U.S. PATENT DOCUMENTS

| | | |
|---|---|---|
| 5,307,495 A | 4/1994 | Seino et al. |
| 5,411,824 A | 5/1995 | Vasudev et al. |
| 5,588,152 A | 12/1996 | Dapp et al. |
| 5,590,345 A | 12/1996 | Barker et al. |
| 5,625,836 A | 4/1997 | Barker et al. |
| 5,708,836 A | 1/1998 | Wilkinson et al. |
| 5,710,938 A | 1/1998 | Dahl et al. |

(Continued)

FOREIGN PATENT DOCUMENTS

| | | |
|---|---|---|
| EP | 1313029 A1 | 5/2003 |
| WO | 9516239 A1 | 6/1995 |

(Continued)

OTHER PUBLICATIONS

U.S. Appl. No. 13/594,125 by Felch, filed Aug. 24, 2012.

(Continued)

*Primary Examiner* — Chuong D Ngo
*Assistant Examiner* — Matthew Sandifer
(74) *Attorney, Agent, or Firm* — Wolf, Greenfield & Sacks, P.C.

(57) ABSTRACT

An automated method of performing exponentiation is disclosed. A plurality of tables holding factors for obtaining results of Exponentiations are provided. The plurality of tables are loaded into computer memory. Each factor is the result of a second exponentiation of a constant and an exponent. The exponent is related to a memory address corresponding to the factor. A plurality of memory addresses are identified for performing the first exponentiation by breaking up the first exponentiation into equations, the results of which are factors of the first Exponentiation. The exponents of the equations are related to the memory addresses corresponding to the factors held in the tables. A plurality of lookups into the computer memory are performed to retrieve the factors held in the tables corresponding to the respective memory addresses. The retrieved factors are multiplied together to obtain the result of the first exponentiation.

10 Claims, 15 Drawing Sheets

(56) References Cited

U.S. PATENT DOCUMENTS

| | | | |
|---|---|---|---|
| 5,713,037 | A | 1/1998 | Wilkinson et al. |
| 5,717,943 | A | 2/1998 | Barker et al. |
| 5,717,944 | A | 2/1998 | Wilkinson et al. |
| 5,734,921 | A | 3/1998 | Dapp et al. |
| 5,752,067 | A | 5/1998 | Wilkinson et al. |
| 5,754,871 | A | 5/1998 | Wilkinson et al. |
| 5,761,523 | A | 6/1998 | Wilkinson et al. |
| 5,765,011 | A | 6/1998 | Wilkinson et al. |
| 5,794,059 | A | 8/1998 | Barker et al. |
| 5,870,619 | A | 2/1999 | Wilkinson et al. |
| 5,878,241 | A | 3/1999 | Wilkinson et al. |
| 5,963,745 | A | 10/1999 | Collins et al. |
| 5,963,746 | A | 10/1999 | Barker et al. |
| 5,966,528 | A | 10/1999 | Wilkinson et al. |
| 6,094,715 | A | 7/2000 | Wilkinson et al. |
| 6,754,802 | B1 | 6/2004 | Kirsch |
| 6,757,019 | B1 | 6/2004 | Hsieh et al. |
| 6,910,059 | B2 * | 6/2005 | Lu et al. ............ 708/606 |
| 7,069,416 | B2 | 6/2006 | Kirsch |
| 7,132,664 | B1 | 11/2006 | Crosetto |
| 7,159,082 | B1 | 1/2007 | Wade |
| 7,167,890 | B2 | 1/2007 | Lin et al. |
| 7,512,816 | B2 | 3/2009 | Ootsuka et al. |
| RE41,293 | E | 4/2010 | Drogichen et al. |
| 7,693,991 | B2 | 4/2010 | Greenlee et al. |
| 8,200,992 | B2 | 6/2012 | Felch et al. |
| 8,356,066 | B1 * | 1/2013 | Verma .................. 708/605 |
| 2002/0147753 | A1 * | 10/2002 | Rao et al. ............ 708/606 |
| 2003/0149857 | A1 * | 8/2003 | Stein et al. .......... 711/206 |
| 2003/0222879 | A1 | 12/2003 | Lin et al. |
| 2006/0261279 | A1 | 11/2006 | Crosetto |
| 2007/0083785 | A1 | 4/2007 | Sutardja |
| 2007/0094444 | A1 | 4/2007 | Sutardja |
| 2007/0226522 | A1 | 9/2007 | Aleksic et al. |
| 2008/0040563 | A1 | 2/2008 | Brittain et al. |
| 2008/0140921 | A1 | 6/2008 | Sutardja et al. |
| 2008/0184229 | A1 | 7/2008 | Rosu et al. |
| 2009/0037504 | A1 * | 2/2009 | Hussain ............... 708/277 |
| 2009/0083263 | A1 | 3/2009 | Felch et al. |
| 2009/0214040 | A1 | 8/2009 | Funk et al. |
| 2010/0306299 | A1 * | 12/2010 | Reidenbach .......... 708/492 |

FOREIGN PATENT DOCUMENTS

| | | | |
|---|---|---|---|
| WO | 9963751 | A1 | 12/1999 |
| WO | 03088033 | A1 | 10/2003 |

OTHER PUBLICATIONS

U.S. Appl. No. 13/594,137 by Felch, filed Aug. 24, 2012.
U.S. Appl. No. 13/594,148 by Felch, filed Aug. 24, 2012.
U.S. Appl. No. 13/594,181 by Felch, filed Aug. 24, 2012.
U.S. Appl. No. 13/594,207 by Felch, filed Aug. 24, 2012.
Cascaval et al, "Evaluation of a Multithreaded Architecture for Cellular Computing", 2002, pp. 1-11, Publisher: IEEE, Published in: US.
Grimm et al, "Parallel Volume Rendering on a single-chip SIMD Architecture", 2001, pp. 107-114, Publisher: IEEE, Published in: DE.
Birkland et al, "The Petacomp Machine a MIMD Cluster for Parallel Pattern Mining", 2006, pp. 1-10, Publisher: IEEE, Published in: NO.
Barroso et al, "Web Search for a Planet the Google Cluster Architecture", Mar. 2003, pp. 22-28, Publisher: IEEE, Published in: US.
Hennessy et al, "MultiThreading Using ILP Support to Exploit Thread Level Parallelism", 2007, pp. 172-179, Publisher: Computer Architecture, Published in: US.
Moore, Branden J., "Exploiting Large Shared On-Chip Caches for Chip Multiprocessors", Apr. 2005, pp. 1-69, Published in: US.
Olukotun et al, "Chip Multiprocessor Architecture", Nov. 28, 2007, pp. 1-47, Publisher: Morgan & Claypool, Published in: US.
Clabes, et al., "Design and Implementation of the POWER5(TM) Microprocessor", "2004 IEEE International Conference on Integrated Circuit Design and Technology", May 17, 2004, pp. 143-145, Publisher: IEEE, Published in: US.
Elliot et al, "Computational RAM Implementing Processors in Memory", Mar. 1999, pp. 32-41, Publisher: IEEE, Published in: US.
Murakami et al, "Parallel Processing RAM Chip with 256Mb DRAM and Quad Processors", Feb. 1997, pp. 228-229, Publisher: IEEE, Published in: JP.
Office Action issued Sep. 6, 2012 in CN Application No. 200880117897.9.
Barroso et al, "Web Search for a Planet: The Google Cluster Architecture," IEEE MICRO, vol. 23, No. 2, pp. 22-28 (Mar.-Apr. 2003).
Hennessy, "Computer Architecture: A Quantitative Approach. Chapter Three, Limits on Instruction-Level Parallelism," Fourth Ed., pp. 172-179 (Sep. 27, 2006).
U.S. Appl. No. 13/493,515 by Felch, filed Jun. 11, 2012.
Extended (Partial) European Search Report issued Feb. 12, 2013 in EP Application No. 12173452.9, 18 pages.
Cieslewicz et al, "Realizing Parallelism in Database Operations: Insights from a Massively Multithreaded Architecture," Proceedings of the Second International Workshop on Data Management on New Hardware (Jun. 25, 2006), 8 pages.
Office Action issued Oct. 14, 2013 in EP Application No. 12 173 452.9.

* cited by examiner

METHODS AND SYSTEMS FOR PERFORMING EXPONENTIATION IN A PARALLEL PROCESSING ENVIRONMENT

CROSS-REFERENCE TO RELATED APPLICATIONS

This application claims priority to U.S. Provisional Patent Application No. 61/528,074 filed Aug. 26, 2011, which is incorporated herein by reference.

BACKGROUND OF THE INVENTION

In many computer applications it is necessary to perform certain calculations many times. Since computers carry out these calculations as functions, the speed with which these functions can be completed becomes very important to the overall system performance. For example, financial applications often require the calculation of the exponentiation function and their performance often relies critically on the performance of the exponentiation calculation. In finance, slower calculations can result in algorithms that suggest trades after the market is no longer well suited for such trades.

Transcendental functions require complex calculations because they cannot be calculated exactly using only addition, subtraction, multiplication, and division. Instead of performing a complex calculation, it is possible to simply lookup the input value in a table, where each table entry has been pre-calculated to hold the correct output value for the given input. While this method works for inputs that require relatively few bits, such as a 16-bit input, since only a few values need to be stored, in the case of 32-bit inputs, the table must hold over 4-billion entries, which is costly to store and access in efficient memory. In the case of 64-bit inputs, or two 64-bit inputs, the tables would be extremely large and would not fit in a practical memory.

Accordingly, it is desirable to carry out the exponentiation function, which raises the natural number "e" (a constant defined by nature, similar to pi approximated by 2.71828 . . . ) to the power of x in multiple calculations. It is further desirable to reduce the memory requirements that would typically be needed to carry out the exponentiation function with multiple lookups.

BRIEF SUMMARY OF THE INVENTION

In one embodiment, an automated method of performing exponentiation is disclosed. A plurality of tables are provided, each table holding factors for obtaining results of Exponentiations. The plurality of tables are used to obtain the results of a first Exponentiation. The plurality of tables are loaded into computer memory, each table having a plurality of the factors. Each factor is the result of a second exponentiation of a constant and an exponent, the exponent being related to a memory address corresponding to the factor. A plurality of memory addresses are identified for performing the first exponentiation by breaking up the first exponentiation into equations, the results of which are factors of the first Exponentiation. The factors are contained in the plurality of tables. The exponents of the equations are related to the memory addresses corresponding to the factors held in the tables. A plurality of lookups into the computer memory are performed to retrieve the factors held in the tables corresponding to the respective memory addresses. The retrieved factors are multiplied together to obtain the result of the first exponentiation.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DESCRIPTION OF THE INVENTION

Figure 1:
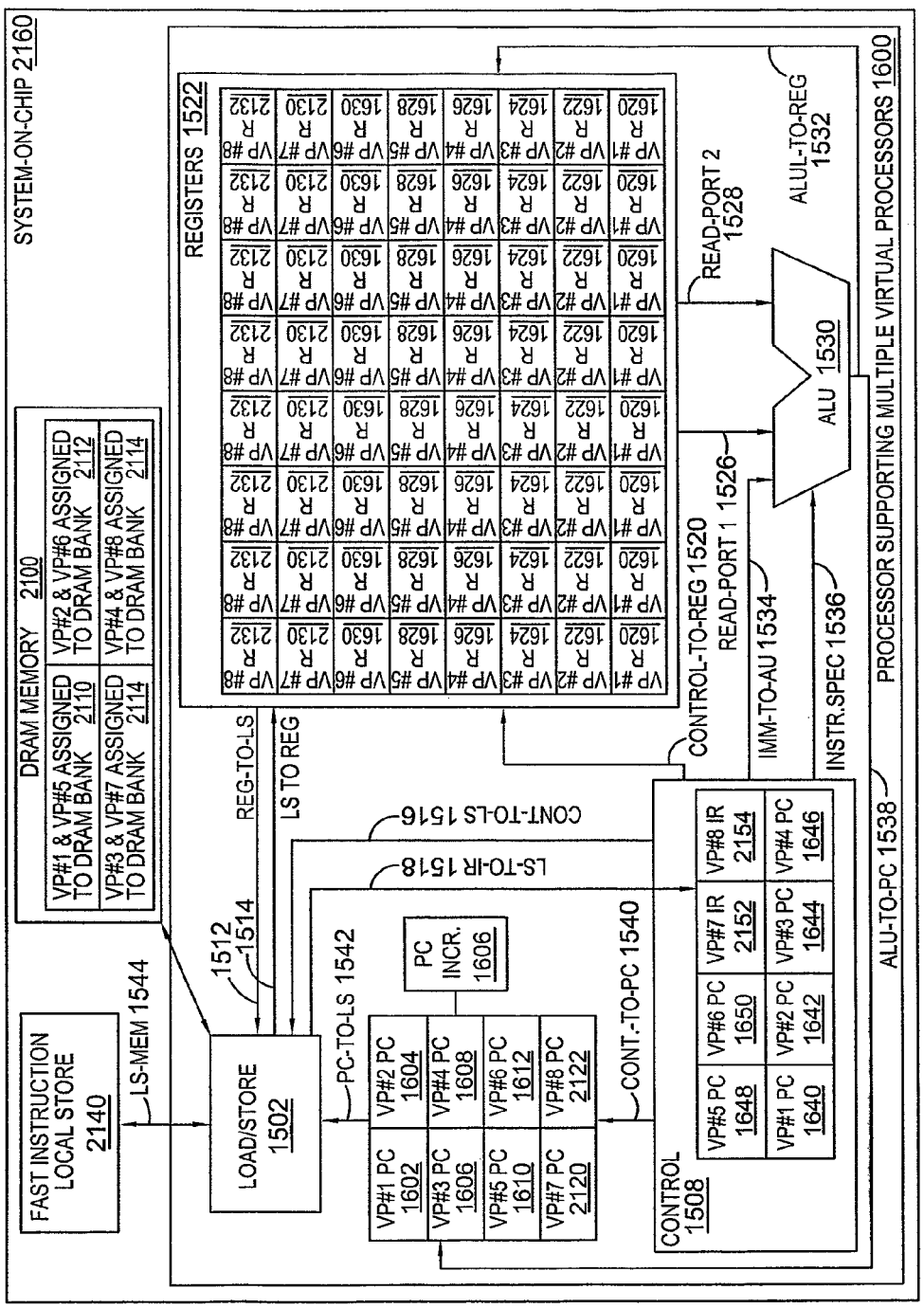
FIG. 1 is an overview of a parallel computing architecture.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

Referring to the drawings in detail, wherein like reference numerals indicate like elements throughout, systems and methods for performing exponentiation using multiple memory lookups are disclosed. Some computer architectures are especially efficient at memory lookups. For these systems, an efficient method that uses precalculated tables to perform calculations can be quite effective. One such calculation is the exponentiation function "e to the x", denoted e^x, which raises the natural number "e" (a constant defined by nature, similar to pi) to the power of x. The exponentiation function can be broken up into multiple calculations. Further, a parallel processing architecture that reduces the memory requirements that would typically be needed to carry out the exponentiation with multiple lookups is described.

When the exponentiation function is in the inner loop of program code (i.e., the exponentiation function is executed often), performance and efficiency can be improved if the calculation is completed quickly. Typically, a sequence of instructions is responsible for carrying out the exp function. One way to accelerate such a function is to create a customized instruction that can carry out all or a sub-part of the function that would normally require many more instructions to complete. For example, the absolute difference |a−b| might require the uncustomized instruction sequence:

$c=a-b$

If $c<0$ $c=-c$ but could be replaced with a single custom instruction:
absdiff a, b, c In the above example, a custom instruction "absdiff" with inputs a & b, and with output c, can be built into the hardware architecture in place of the above three instructions, potentially resulting in significant acceleration (especially in this example since the "if" instruction, called a branch, can cost multiple cycles to execute).

In the case of exponentiation on an architecture for which table lookups (reading words from memory) are efficient, the exp function can be implemented by looking up the bit representation of x in a table of precalculated exp values.

Parallel Computing Architecture

The following parallel computing architecture is one example of an architecture that may be used to implement the features of this invention The architecture is further described in U.S. Patent Application Publication No. 2009/0083263 (Felch et al.), which is incorporated herein by reference. FIG. 1 is a block diagram schematic of a processor architecture 2160 utilizing on-chip DRAM (2100) memory storage as the primary data storage mechanism and Fast Instruction Local Store, or just Instruction Store, 2140 as the primary memory from which instructions are fetched. The Instruction Store 2140 is fast and is preferably implemented using SRAM memory. In order for the Instruction Store 2140 to not consume too much power relative to the microprocessor and DRAM memory, the Instruction Store 2140 can be made very small. Instructions that do not fit in the SRAM are stored in and fetched from the DRAM memory 2100. Since instruction fetches from DRAM memory are significantly slower than from SRAM memory, it is preferable to store performance-critical code of a program in SRAM. Performance-critical code is usually a small set of instructions that are repeated many times during execution of the program.

The DRAM memory 2100 is organized into four banks 2110, 2112, 2114 and 2116, and requires 4 processor cycles to complete, called a 4-cycle latency. In order to allow such instructions to execute during a single Execute stage of the Instruction, eight virtual processors are provided, including new VP#7 (2120) and VP#8 (2122). Thus, the DRAM memories 2100 are able to perform two memory operations for every Virtual Processor cycle by assigning the tasks of two processors (for example VP#1 and VP#5 to bank 2110). By elongating the Execute stage to 4 cycles, and maintaining single-cycle stages for the other 4 stages comprising: Instruction Fetch, Decode and Dispatch, Write Results, and Increment PC; it is possible for each virtual processor to complete an entire instruction cycle during each virtual processor cycle. For example, at hardware processor cycle T=1 Virtual Processor #1 (VP#1) might be at the Fetch instruction cycle. Thus, at T=2 Virtual Processor #1 (VP#1) will perform a Decode & Dispatch stage. At T=3 the Virtual Processor will begin the Execute stage of the instruction cycle, which will take 4 hardware cycles (half a Virtual Processor cycle since there are 8 Virtual Processors) regardless of whether the instruction is a memory operation or an ALU 1530 function. If the instruction is an ALU instruction, the Virtual Processor might spend cycles 4, 5, and 6 simply waiting. It is noteworthy that although the Virtual Processor is waiting, the ALU is still servicing a different Virtual Processor (processing any non-memory instructions) every hardware cycle and is preferably not idling. The same is true for the rest of the processor except the additional registers consumed by the waiting Virtual Processor, which are in fact idling. Although this architecture may seem slow at first glance, the hardware is being fully utilized at the expense of additional hardware registers required by the Virtual Processors. By minimizing the number of registers required for each Virtual Processor, the overhead of these registers can be reduced. Although a reduction in usable registers could drastically reduce the performance of an architecture, the high bandwidth availability of the DRAM memory reduces the penalty paid to move data between the small number of registers and the DRAM memory. This architecture 1600 implements separate instruction cycles for each virtual processor in a staggered fashion such that at any given moment exactly one VP is performing Instruction Fetch, one VP is Decoding Instruction, one VP is Dispatching Register Operands, one VP is Executing Instruction, and one VP is Writing Results. Each VP is performing a step in the Instruction Cycle that no other VP is doing. The entire processor's 1600 resources are utilized every cycle. Compared to the naïve processor 1500 this new processor could execute instructions six times faster.

As an example processor cycle, suppose that VP#6 is currently fetching an instruction using VP#6 PC 1612 to designate which instruction to fetch, which will be stored in VP#6 Instruction Register 1650. This means that VP#5 is Incrementing VP#5 PC 1610, VP#4 is Decoding an instruction in VP#4 Instruction Register 1646 that was fetched two cycles earlier. VP #3 is Dispatching Register Operands. These register operands are only selected from VP#3 Registers 1624. VP#2 is Executing the instruction using VP#2 Register 1622 operands that were dispatched during the previous cycle. VP#1 is Writing Results to either VP#1 PC 1602 or a VP#1 Register 1620.

During the next processor cycle, each Virtual Processor will move on to the next stage in the instruction cycle. Since VP#1 just finished completing an instruction cycle it will start a new instruction cycle, beginning with the first stage, Fetch Instruction.

Figure 2:
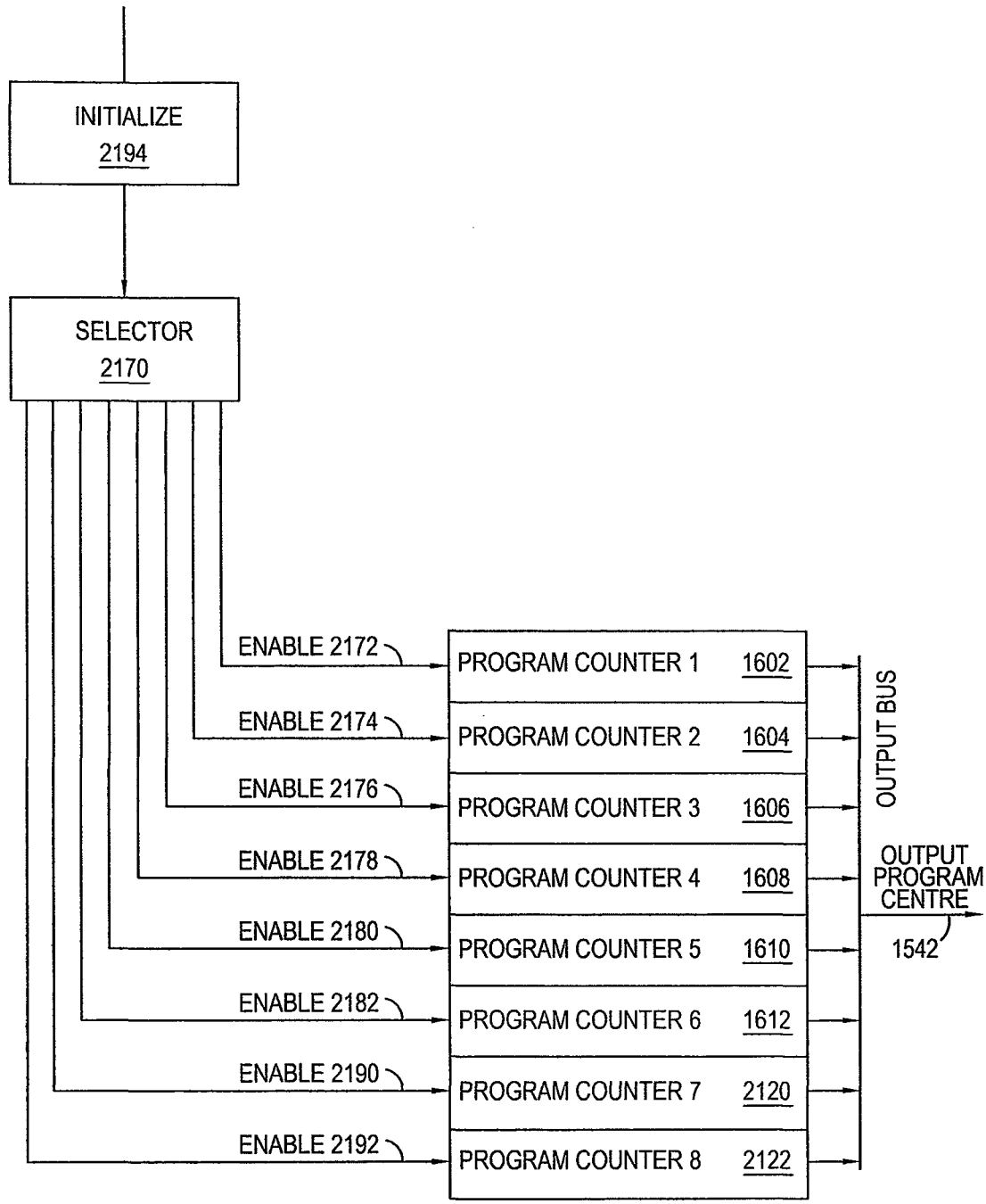
FIG. 2 is an illustration of a program counter selector for use with the parallel computing architecture of FIG. 1.

Note, in the architecture 2160, in conjunction with the additional virtual processors VP#7 and VP#8, the system control 1508 now includes VP#7 IR 2152 and VP#8 IR 2154. In addition, the registers for VP#7 (2132) and VP#8 (2134) have been added to the register block 1522. Moreover, with reference to FIG. 2, a Selector function 2110 is provided within the control 1508 to control the selection operation of each virtual processor VP#1-VP#8, thereby maintaining the orderly execution of tasks/threads, and optimizing advantages of the virtual processor architecture the has one output for each program counter and enables one of these every cycle. The enabled program counter will send its program counter value to the output bus, based upon the direction of the selector 2170 via each enable line 2172, 2174, 2176, 2178, 2180, 2182, 2190, 2192. This value will be received by Instruction Fetch unit 2140. In this configuration the Instruction Fetch unit 2140 need only support one input pathway, and each cycle the selector ensures that the respective program counter received by the Instruction Fetch unit 2140 is the correct one scheduled for that cycle. When the Selector 2170 receives an initialize input 2194, it resets to the beginning of its schedule. An example schedule would output Program Counter 1 during cycle 1, Program Counter 2 during cycle 2, etc. and Program Counter 8 during cycle 8, and starting the schedule over during cycle 9 to output Program Counter 1 during cycle 9, and so on . . . . A version of the selector function is applicable to any of the embodiments described herein in which a plurality of virtual processors are provided.

To complete the example, during hardware-cycle T=7 Virtual Processor #1 performs the Write Results stage, at T=8 Virtual Processor #1 (VP#1) performs the Increment PC stage, and will begin a new instruction cycle at T=9. In another example, the Virtual Processor may perform a memory operation during the Execute stage, which will require 4 cycles, from T=3 to T=6 in the previous example. This enables the architecture to use DRAM 2100 as a low-power, high-capacity data storage in place of a SRAM data cache by accommodating the higher latency of DRAM, thus improving power-efficiency. A feature of this architecture is that Virtual Processes pay no performance penalty for randomly accessing memory held within its assigned bank. This is quite a contrast to some high-speed architectures that use high-speed SRAM data cache, which is still typically not fast enough to retrieve data in a single cycle.

Each DRAM memory bank can be architected so as to use a comparable (or less) amount of power relative to the power consumption of the processor(s) it is locally serving. One method is to sufficiently share DRAM logic resources, such as those that select rows and read bit lines. During much of DRAM operations the logic is idling and merely asserting a previously calculated value. Using simple latches in these circuits would allow these assertions to continue and free-up the idling DRAM logic resources to serve other banks. Thus the DRAM logic resources could operate in a pipelined fashion to achieve better area efficiency and power efficiency.

Another method for reducing the power consumption of DRAM memory is to reduce the number of bits that are sensed during a memory operation. This can be done by decreasing the number of columns in a memory bank. This allows memory capacity to be traded for reduced power consumption, thus allowing the memory banks and processors to be balanced and use comparable power to each other.

The DRAM memory 2100 can be optimized for power efficiency by performing memory operations using chunks, also called "words", that are as small as possible while still being sufficient for performance-critical sections of code. One such method might retrieve data in 32-bit chunks if registers on the CPU use 32-bits. Another method might optimize the memory chunks for use with instruction Fetch. For example, such a method might use 80-bit chunks in the case that instructions must often be fetched from data memory and the instructions are typically 80 bits or are a maximum of 80 bits.

Figure 3:
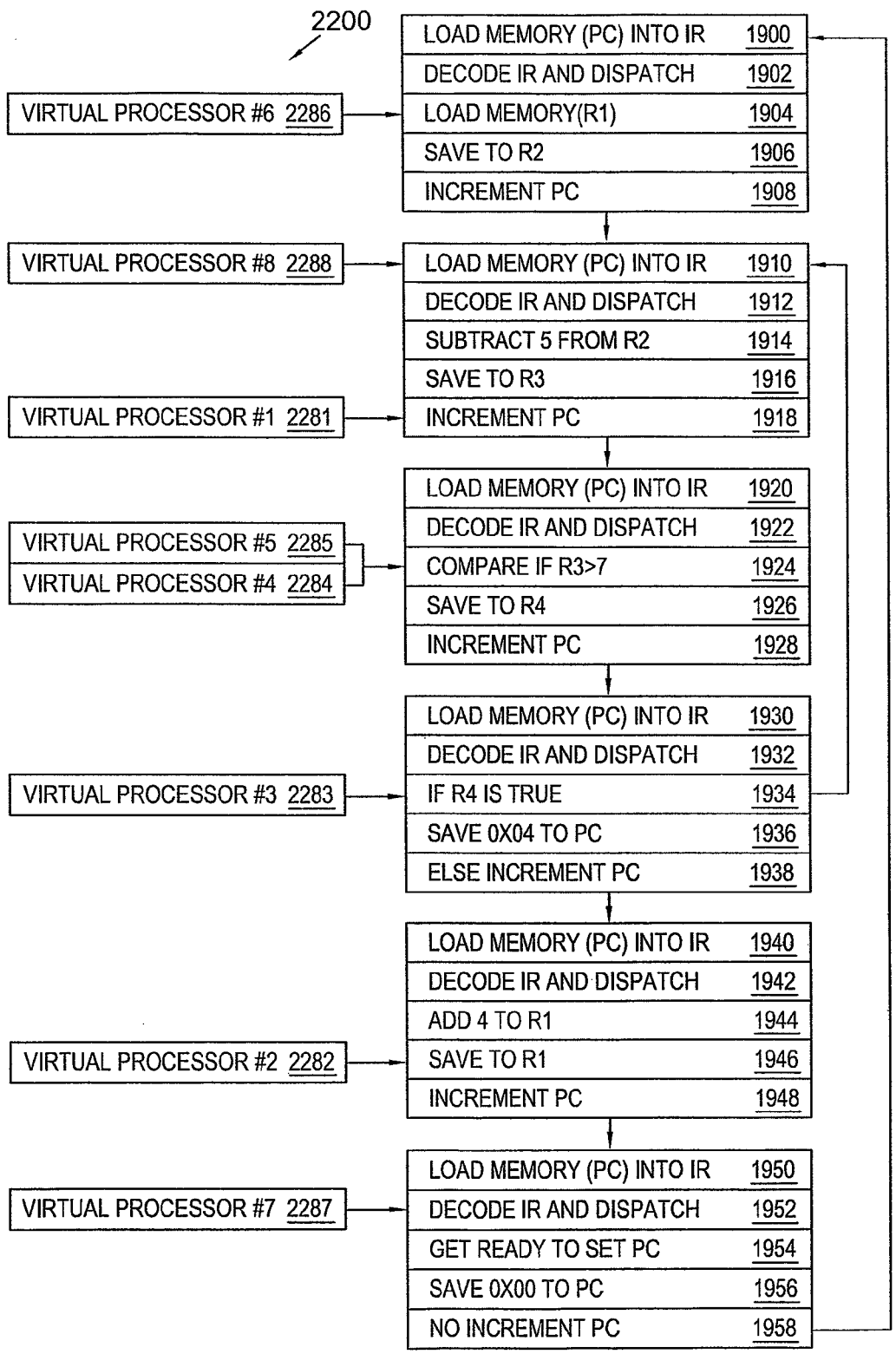
FIG. 3 is a block diagram showing an example state of the architecture.

FIG. 3 is a block diagram 2200 showing an example state of the architecture 2160 in FIG. 1. Because DRAM memory access requires four cycles to complete, the Execute stage (1904, 1914, 1924, 1934, 1944, 1954) is allotted four cycles to complete, regardless of the instruction being executed. For this reason there will always be four virtual processors waiting in the Execute stage. In this example these four virtual processors are VP#3 (2283) executing a branch instruction 1934, VP#4 (2284) executing a comparison instruction 1924, VP#5 2285 executing a comparison instruction 1924, and VP#6 (2286) a memory instruction. The Fetch stage (1900, 1910, 1920, 1940, 1950) requires only one stage cycle to complete due to the use of a high-speed instruction store 2140. In the example, VP#8 (2288) is in the VP in the Fetch Instruction stage 1910. The Decode and Dispatch stage (1902, 1912, 1922, 1932, 1942, 1952) also requires just one cycle to complete, and in this example VP#7 (2287) is executing this stage 1952. The Write Result stage (1906, 1916, 1926, 1936, 1946, 1956) also requires only one cycle to complete, and in this example VP#2 (2282) is executing this stage 1946. The Increment PC stage (1908, 1918, 1928, 1938, 1948, 1958) also requires only one stage to complete, and in this example VP#1 (1981) is executing this stage 1918. This snapshot of a microprocessor executing 8 Virtual Processors (2281-2288) will be used as a starting point for a sequential analysis in the next figure.

Figure 4:
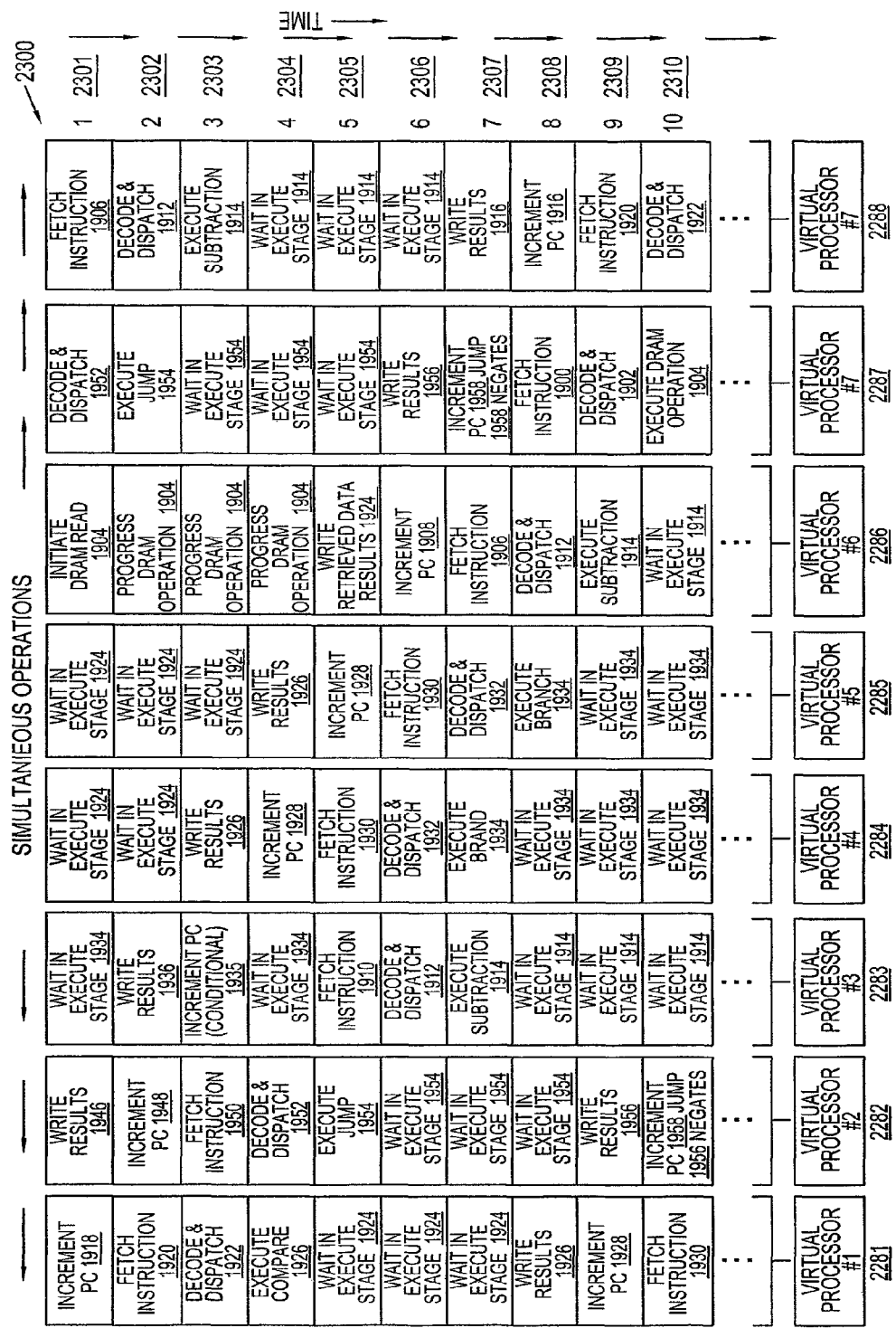
FIG. 4 is a block diagram illustrating cycles of operation during which eight Virtual Processors execute the same program but starting at different points of execution.

FIG. 4 is a block diagram 2300 illustrating 10 cycles of operation during which 8 Virtual Processors (2281-2288) execute the same program but starting at different points of execution. At any point in time (2301-2310) it can be seen that all Instruction Cycle stages are being performed by different Virtual Processors (2281-2288) at the same time. In addition, three of the Virtual Processors (2281-2288) are waiting in the execution stage, and, if the executing instruction is a memory operation, this process is waiting for the memory operation to complete. More specifically in the case of a memory READ instruction this process is waiting for the memory data to arrive from the DRAM memory banks. This is the case for VP#8 (2288) at times T=4, T=5, and T=6 (2304, 2305, 2306).

When virtual processors are able to perform their memory operations using only local DRAM memory, the example architecture is able to operate in a real-time fashion because all of these instructions execute for a fixed duration.

Figure 5:
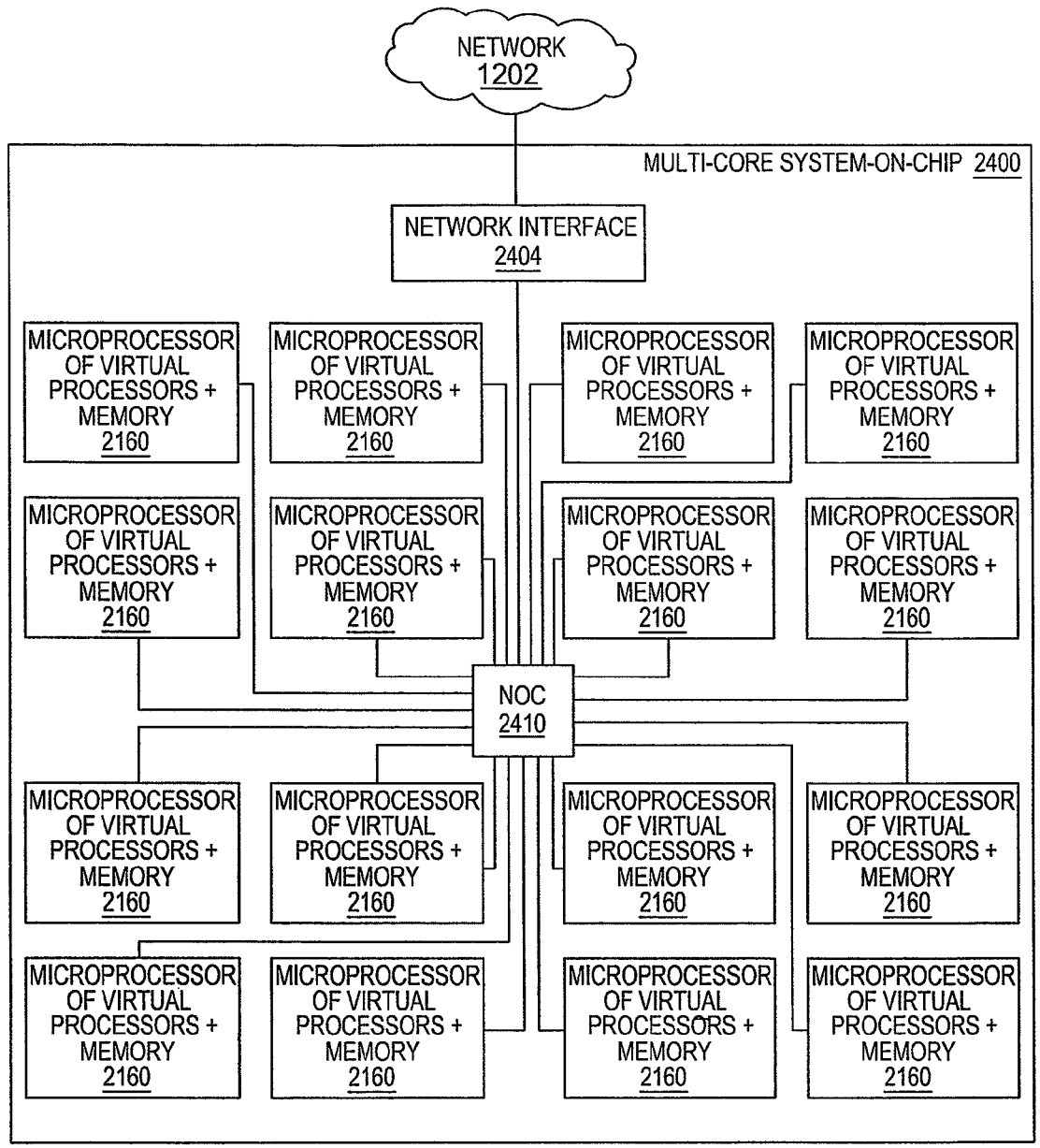
FIG. 5 is a block diagram of a multi-core system-on-chip.

FIG. 5 is a block diagram of a multi-core system-on-chip 2400. Each core is a microprocessor implementing multiple virtual processors and multiple banks of DRAM memory 2160. The microprocessors interface with a network-on-chip (NOC) 2410 switch such as a crossbar switch. The architecture sacrifices total available bandwidth, if necessary, to reduce the power consumption of the network-on-chip such that it does not impact overall chip power consumption beyond a tolerable threshold. The network interface 2404 communicates with the microprocessors using the same protocol the microprocessors use to communicate with each other over the NOC 2410. If an IP core (licensable chip component) implements a desired network interface, an adapter circuit may be used to translate microprocessor communication to the on-chip interface of the network interface IP core.

The Exponentiation Function

One way to calculate an exponentiation is to precalculate $e^x$ for all possible x values. If x can be positive or negative, we will need two sets of tables. If the fraction part of x has 9 significant digits then each table will have one-billion entries. If the fraction part of x is between −49 and 50, then it has 100 possible values, so that we will have in total two sets of 1,000 tables, and each table will have one-billion entries. If each entry is 4 bytes, these tables would require 2*1,000,000,000*100*4 bytes=800 gigabytes. A workaround to the very large table size is arrived at by recalling a rule of exponents that allows breaking up the computation into any number of separate factors:

$$e^{x+y+z}=e^x*e^y*e^z$$

All of the table entries can then be precalculated, and the exponentiation can be performed using the following steps:

A) Use the sign part to select which set of tables to look in;
B) Use the exponent part to select which table we need to look in; and
C) Use the fraction part to select which entry in the table to retrieve.

Figure 8:
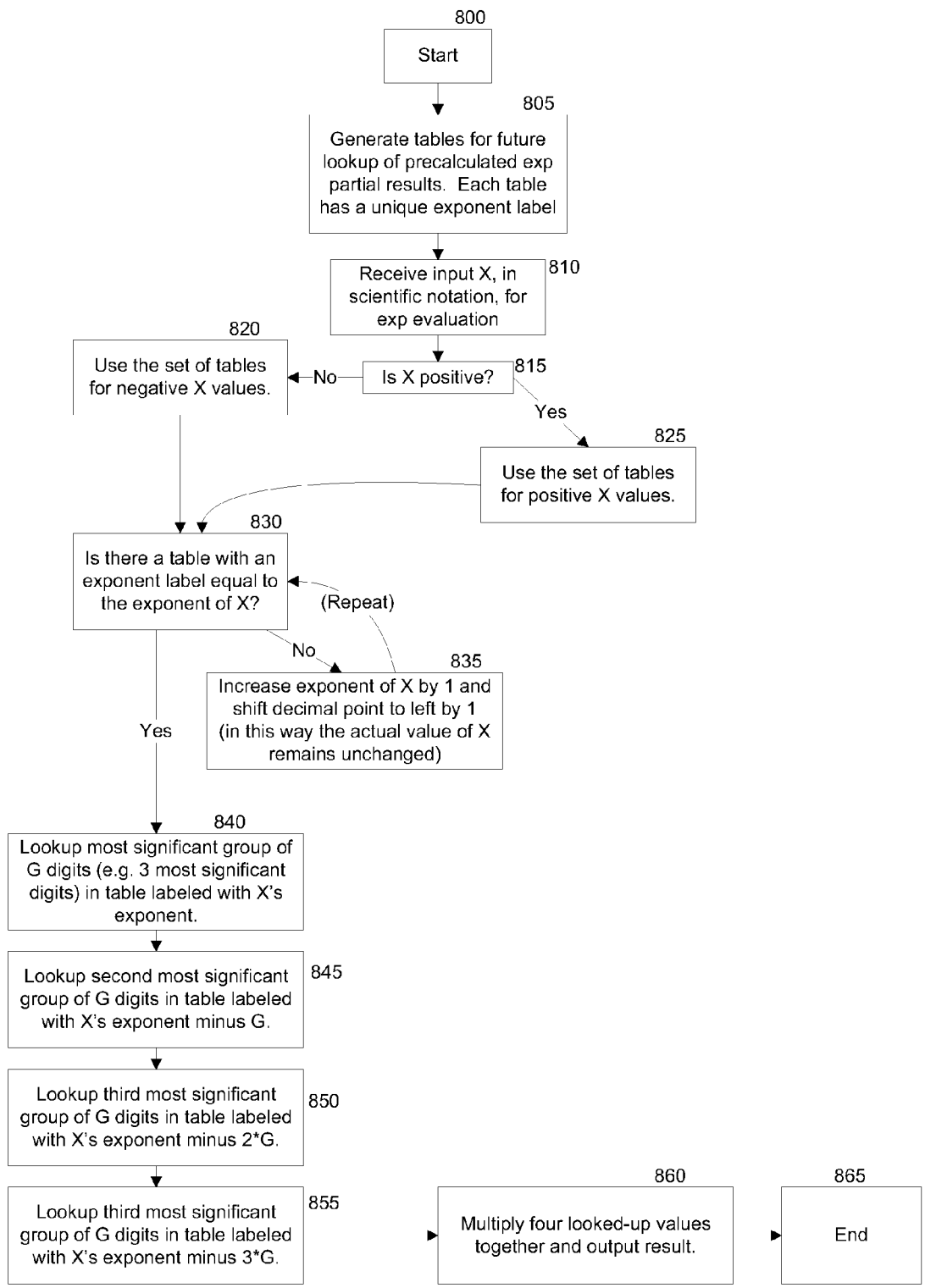
FIG. 8 is a high level flow chart illustrating steps for calculating the output of the function exp(x) in accordance with one preferred embodiment of this invention.

FIG. 8 shows a high level flow chart illustrating steps for calculating the output of the function exp(x). The process starts at step 800 and proceeds to step 805 where tables of precalculated exponentiation values are computed for a range of input values. Two sets of tables, one set for positive X inputs and one set for negative X inputs are generated. The tables are ordered, with each table having a unique exponent label. The label for a particular table corresponds to the range of inputs for which the table holds exponentiation values. Although the tables can be of various sizes and the invention is not limited to tables of any size, for simplicity, the following exemplary discussion will be based on 1024-byte tables, wherein each table holds 256 values, and each value is a 32-bit (4-byte) floating point value. Each exponentiation value in a table is derived such that the table with a label of Y holds exp(0x00*(c^Y)) through exp(0xFF*(c^Y)), where c is the base of the floating point input value's exponent. For example, in decimal representations the entry at index 0x03 in table 6 is equal to exp(0x03*(10^3)). Note that because each table holds only 256 values, it only takes into account 8 bits of precision in the input value. Tables may be combined together to increase the amount of precision in the input value that is taken into account in producing the result of the exp function.

At step 810, the input X is received and compared with 0 to determine whether the input is positive or negative at step 815. If the input X is equal to or greater than 0, the process proceeds to step 825, otherwise X is negative and the process proceeds to step 820. In step 820, the set of tables designated for negative values of X is selected and will be used in all subsequent steps. Similarly, in step 825 the set of tables designated for positive values of X is selected and will be used in all subsequent steps. Both steps 820 and 825 proceed to step 830.

At step 830, the exponent value (the value for Y), is compared with the labels of the tables. If there is a precomputed table with the same label as Y, the process proceeds to step 840. Otherwise, the process proceeds to step 835, where Y is increased by 1 and the decimal point of the fraction part (also called the mantissa) is moved one place to the left so that the value of X remains unchanged. After modifying Y in step 835, the process returns to step 830 again. The cycle of steps 830 and 835 continues until Y has a value for which there is a corresponding precomputed table, at which point the process continues to step 840.

Steps 840, 845, 850 and 855 each perform similar operations to each other, each step using a different table and different index into the table in order to retrieve a value. After steps 840-855, the four values retrieved in steps 840-855 are multiplied together in step 860, and the product is the result output from the exp(x) function. After outputting the result at step 860, the process ends. The lookups of steps 840-855 will now be discussed in further detail.

In step 840, the G most significant digits are used to generate a table index, which is looked up in the table with the Y label. In step 845 the G most significant bits that were not used for the index in step 840 are used for an index into the table with the Y-G label. In step 850 the G most significant bits of X that were not used for indices in steps 840-845 are used as an index into the table labeled with the exponent Y-(2*G). Finally, the remaining G bits (the only bits in the mantissa of X which have not yet been used as a table index) are used as an index into the table corresponding to the exponent Y-(3*G).

Figure 6:
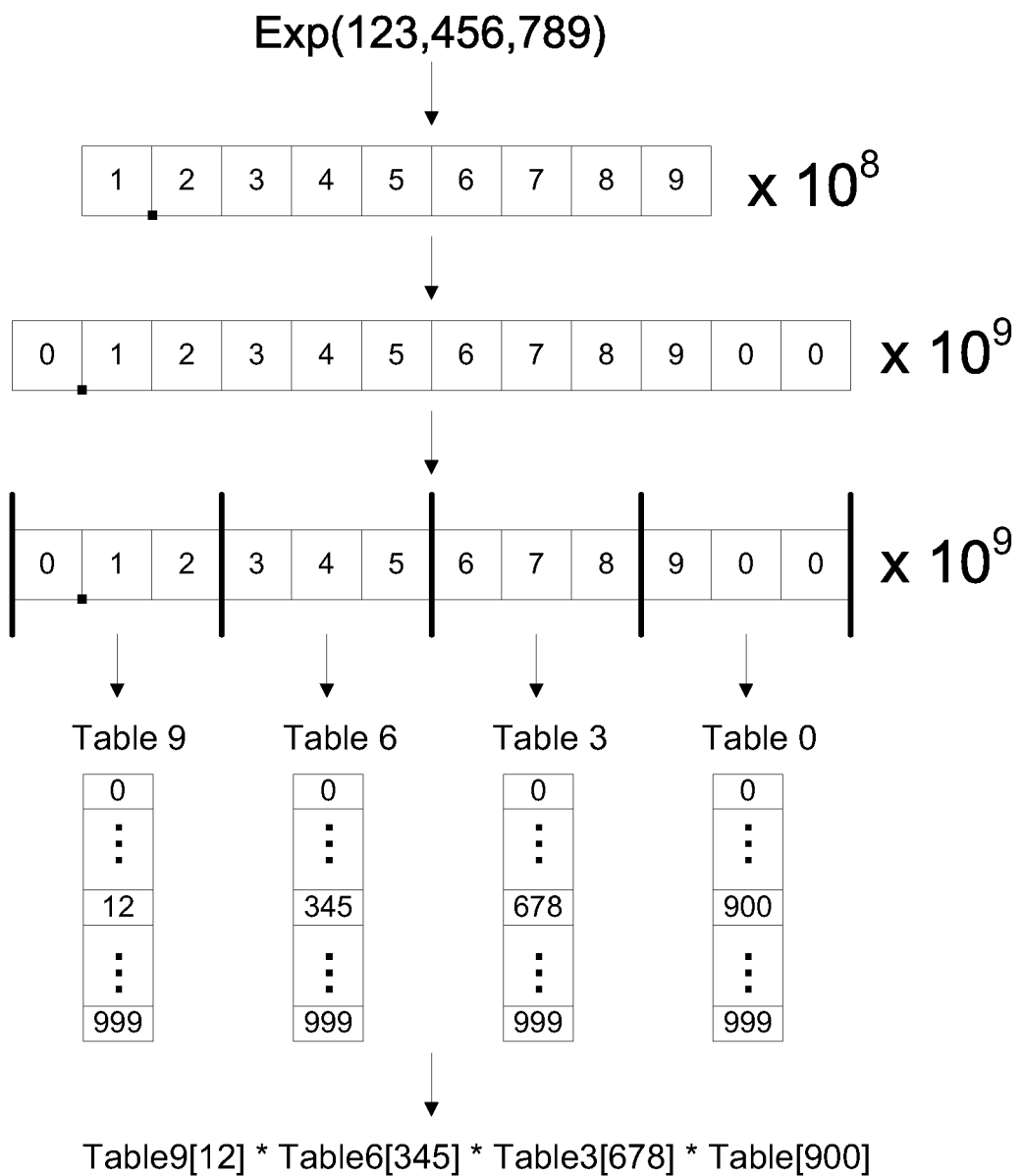
FIG. 6 illustrates an example in decimal of the calculation of an output of the function exp(x) for an input of X in accordance with one preferred embodiment of this invention.

FIG. 6 illustrates an example in decimal of the calculation of an output of the function exp(x) for an input of X=123,456, 789 using the method of FIG. 8 described above. The example is provided in decimal for ease of understanding; however, it should be understood that such calculations will be performed in binary in a computing system such as the parallel computing system described above. An example of the exponentiation function in binary is presented below.

The top row of FIG. 6 shows the input X. In the second row, X is shown in scientific notation. In scientific notation, the input X is represented as X=1.23456789*(10^8). Scientific notation is how floating point values are stored in computers. In this example, 1.23456789 is the fraction part and 8 is the exponent part. Recalling the property of exponents, the input X can be broken up as follows:

$$1.23456789*(10^8)=1.23*(10^8)+4.56*(10^5)+7.89*(10^2)$$

Under the exponentiation rule, the input X may be represented as:

$$e^x=e^{(1.23456789*10^8)}=e^{(1.23*10^8)}*e^{(4.56*10^5)}*e^{(7.89*10^2)}$$

Each of the factors $e^{(1.23*10^8)}$, $e^{(4.56*10^5)}$, $e^{(7.89*10^2)}$ may now be calculated separately. Since each fraction part has only 3 significant digits, tables with just 1,000 entries can be used to account for the 1,000 possible values of a three-significant-digit number. This reduces the requirements to 2 sets of tables, each with 100 tables, each table with 1,000 entries, each entry 4 bytes; thereby reducing our memory requirements from 800 gigabytes down to 800 kilobytes.

In fact, it is possible to further reduce the memory requirements by reducing the number of tables uses so that not every possible exponent has a corresponding table. Every third table of exponents will be stored, so that tables are available for exponents;

0, 3, 6, 9, 12, 15, 18, 21, 24, 27, 30, 33, 36, 39, 42, 45, 48, 51; and
−3, −6, −9, −12, −15, −18, −21, −24, −27, −30, −33, −36, −39, −42, −45, −48, −51

In the third row, the exponent of the input X is rounded to a value divisible by 3 and the decimal part is shifted appropriately so that the it remains the same value as the input X. In the fourth row, the total fraction part is divided into four separate sections, with each section representing an index into a lookup table. Thus, the input X can be represented as follows:

$$0.123456789*(10^9)=0.12*(10^9)+3.45*(10^6)+6.78*(10^3)+9.00*(10^0)$$

Using the exponentiation rule we get:

$$e^x=e^{(0.123456789*10^9)}=e^{(0.12*10^9)}*e^{(3.45*10^6)}*e^{(6.78*10^3)}*e^{(9.00*10^0)}$$

Returning to FIG. 6, each index within the tables is between 0 and 999 and each lookup is made in a different table, as shown in the fifth row. The use of four summing numbers instead of three allows us to use only the new set of exponent tables −51, −48 . . . −3, 0, 3 . . . 48, 51, which requires only 34 tables instead of 100. Thus, our memory requirements are reduced to two sets of tables, each with 34 tables, each table with 1,000 entries, each entry 4 bytes=272 kilobytes (down from 800 kilobytes). In determining the number of tables, there will be a sweet spot or set of sweet spots where the number of table entries is increased in order to decrease the number of tables, or vice versa. It should be understood that more table entries also can reduce the number of lookups required by calculating for a larger portion of the total significant digits per lookup.

Binary Explanation and Example

Now turning to the binary example, computers use binary representations typically denoted with a trailing "b" or subscript "2", such as $1.01101b*2^{1011b}$. In this discussion, single precision will be used. In single precision, 32 bits are used to store values, but the same principles extend to double precision (64-bit) and other precisions and this invention is not limited to any type of precision.

In binary, a sign bit is used to represent the sign of a value, a "1" sign-bit means negative and "0" sign-bit means positive. The exponent value is stored with 8 bits, representing a positive integer from 1-254 (exponent of 00000000b and 11111111b are reserved for special purposes). A "bias", in this case −127, is added to yield the exponent value, which allows representation of both positive and negative values in the range −126 to 127. Because in scientific notation it is standard to have only one digit before the decimal point, and to adjust the exponent accordingly, the binary representation will always have a "1" bit before the decimal point. Because this is always the case, this bit is not stored in the computer representation, and is called the "implied bit". To summarize, the value is derived from the bits as:

$$=(-1)^{sign}(1 \cdot b_{-1}b_{-2}\ldots b_{-23})_2 \times 2^{e-127}$$

One way to allow a table lookup of the exponentiation $e^x$ value is to store a result for each possible combination of the 32 bits. Because the number of combinations of bits is very high (over 4 billion), the data is too large (16 gigabytes) to store in memory efficiently. Again, the rule of exponents allows to break up the computation into any number of separate factors. For example, a 24-bit number such as:

$$x=1.000011100000011000000001b*2^{27}$$

Can be segmented into 8 bit sections:

$$x=(1.0000111b*2^{27})=(0.0000011b*2^{19})+(0.0000001b*2^{11})$$

And using the exponentiation rule:

$$e^x = e^{(1.0000111b*2^{\wedge}27)} = e^{(0.0000011b*2^{\wedge}19)} * e^{(0.0000001b*2^{\wedge}11)}$$

Again, a table of precomputed exp results for each possible exponent from −126 to 127 can be generated, requiring 254 tables. In this case, each table has 256 entries to account for all bit combinations of the 8-bit parts. While this is significantly more memory efficient than a single table with 4 billion entries, the efficiency can be further improved to reduce the number of tables required. As in the decimal example, instead of keeping a table for every possible exponent, just one table for every 8 values is used, so that instead of holding a table for each exponent, tables are stored for every eighth interval:

−127, −119, −111, −103, −95, −87, . . . −7, 1, 9, . . . 89, 97, 105, 113, 121.

This allows us to use just 32 tables instead of 254. However, because the tables are different for positive and negative numbers, 64 tables are needed (two sets of 32 tables each). Furthermore, in many cases, the precomputed values are too small (i.e. result in exponents below −126) or too large (i.e. result in exponents above 127) to be represented in single precision, resulting in special zero or infinity representations.

In fact many tables will be filled with all zero results, or all infinity results, and when the tables are duplicates of each other only one copy needs to be stored.

To use the reduced number of tables, we need to build a representation of the input value using only those exponents for which we have tables. This may require one additional factor. Continuing the example above, this representation would be:

$$x=(0.0000010b*2^{33})+(0.0011100b*2^{25})+(0.0001100b*2^{17})+(0.0000100b*2^{9})$$

In the above example, a "shift" was required to form the new representation. In this example, the first two bits "10" became the last two bits in the first part, bits 3-10 "00011100" became bits 1-8 of the second part, and so on. As a result, the exponents 33, 25, 17, and 9 are all included in the condensed list of tables described above.

Figure 9:
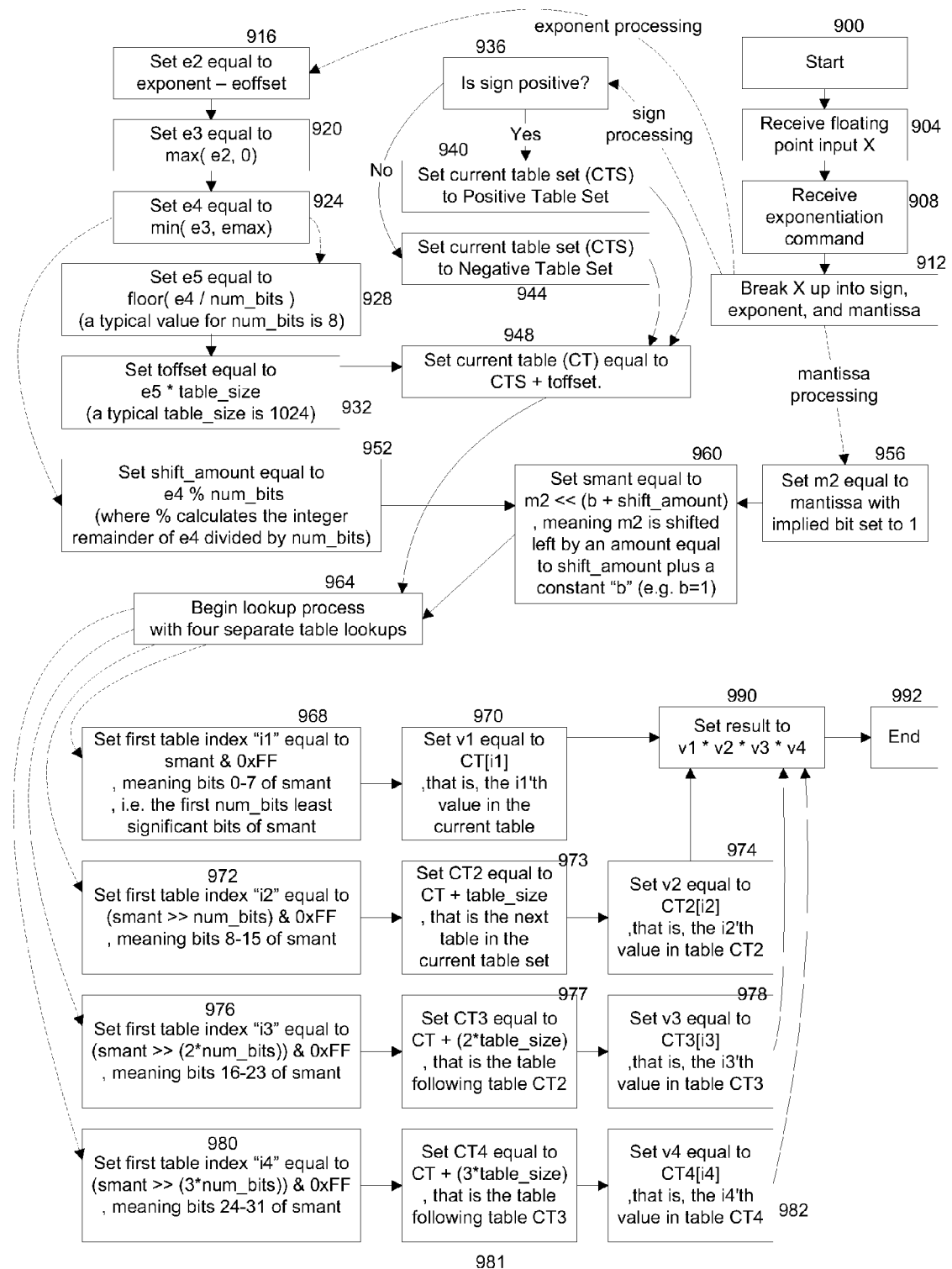
FIG. 9 illustrates a flow chart by which a binary floating point value is received as input X to the exp function in accordance with one preferred embodiment of this invention.

FIG. 9 illustrates a flow chart by which a binary floating point value is received as input X to the exp function. The process starts at step 900 and the bits are manipulated and temporary values are generated during the process that will be described, until the final result of exp(x) is computed in step 990 and the process terminates at step 992. In step 904 an input X is received and in step 908 the command to calculate exp(x) is received. Note that though steps 904 and 908 are shown separately, in other embodiments the value and the command may be received in a single step.

In step 912 the value of X is broken into three parts: 1) sign, 2) exponent, 3) mantissa. The value of X is equal to "(−1^sign)*mantissa*(2^(exponent-bias)), where bias is a constant built into the floating point representation (e.g. 127 for IEEE single-precision 32-bit floating point values). Steps 916-932 (exponent processing), 936-944 (sign processing), and 956 (mantissa processing) can be calculated in parallel, which is depicted by the dashed lines that point from step 912 to steps 916, 936, and 956. Any order can be chosen for performing parallel steps in serial. For example, if it is desired that the steps are executed in serial then the process may proceed by computing steps 916-932, then steps 936-948, then step 952, and then steps 956-964.

First, the sign processing portion will be discussed. In step 936 the sign bit is analyzed to determine if it is positive, and if so the Current Table Set ("CTS") is set to the Positive Table set in step 940, otherwise the CTS is set to the negative table set in step 944. In either case, the process then proceeds to step 948, which will not be completed until steps 916-932 are completed.

The exponent is next processed beginning with step 916, where a temporary value e2 is set to "exponent—eoffset". The preferable method of calculating the eoffset is described below. However, it should be noted that an eoffset value of zero is usable, but results in using more tables filled with repetitive values of 1.0. In calculating the value of eoffset, the eoffset value is dependent upon 1) the number of lookups that will be performed, and 2) the number of bits used to index into a table. X values with small exponents produce exp(x) function results that are so close to 1.0 that they are indistinguishable from 1.0 using the number of bits of precision that have been selected for the calculation. For example, to determine the value of eoffset, consider the case where four lookups of 8 bits are being used. Starting with a "test exponent value" of 0, the maximum value is calculated in a table labeled 0. In this case exp(0xFF*2^0) is greater than 1.0 in single-precision. The value of the test exponent value is decreased by 1 until exp(0xFF*2^(test exponent value)) is equal to 1.0 in single precision. At this point, a table labeled with the test exponent value would be filled with entries of 1.0. The ((number of lookups−1)*number of table index bits) is then subtracted from the test exponent value. The resulting value is eoffset, and it represents the label of a table filled with 1's and the subsequent number-of-lookups-minus-1 tables are also filled with values of 1.0. However, this eoffset value does not take into account exponent bias (127 in single precision). To account for the bias it is added to the eoffset value to arrive at the final eoffset value. While the process above is described for deriving the eoffset value for the Positive Table Set above, a similar process can be performed for the Negative Table Set. If a single eoffset value is desired for both table sets, then the minimum eoffset values for the two table sets can be used, and the tables in these sets calculated accordingly.

Having determined the eoffset, the temporary value e2 is generated by subtracting eoffset from the exponent value. In step 920, a lower bound of zero is set on the value of e2 and the result is stored in e3. In step 924, an upper bound of emax is set to the value of e3 and the result is stored in e4. While emax may be equal to the highest possible exponent in the floating point representation being used, this is a less-than-optimal solution. Instead, emax can be calculated optimally in a similar way to the eoffset value described above.

The exponentiation tables may be generated as previously described with respect to FIG. 8, with the lowest table corresponding to a label of "bias—eoffset". Tables are created for every value equal to num_bits_in_table_index, this value is 8 in the examples above.

Tables are created until a table that contains all infinity results (or zero results in the case of calculations using the Negative Table Set) is created. At that point, one more table above this table is created and filled with all infinity values (or zeros), including at the position of 0x00, which would normally be equal to 1.0 (because exp(0x00*arbitrary_number) equals 1.0). This ensures that if any value is looked up in this highest table, the value looked up in the table will overrule all other factors that will be multiplied together in step 990. Therefore, it is not necessary to create more values tables filled with infinity values, but instead emax is set to the label of this maximum table. To take into account eoffset and bias, emax is then set to the value of (label+bias−eoffset).

Next, at step Step 928, e5 is set equal to e4/num_bits, with any remainder being ignored (num_bits value is the number of bits used to produce the index into any of the precalculated tables). When num_bits is a power of 2, this division can be carried out with a right shift of d, where num_bits=2^d. Step 932 calculates a temporary value toffset, which equals e5 multiplied by the size of a precalculated table ((2^num_bits) *number of bytes per entry). In this example the value of table_size is 1024, because each precalculated table holds 256 4-byte values. Step 932 proceeds to step 948, where the current table CT is set to the current table set+toffset (here the CTS is a pointer to the first table in the set). Step 952 also follows step 924, but because it can be computed in parallel it can be computed after 928, 932, or 948 as well. Step 952 performs the "mod" function, represented by the percent sign. The mod function of j % k calculates the integer remainder of j divided by k. In this way the value of shift_amount is set to e4% num_bits.

Step 956 can be executed in parallel with any of steps 916-952, and sets the implied bit 1, saving the result in m2. The implied bit is the bit at the more significant position adjacent to the most significant bit of the mantissa. Step 960 can be processed once 952 and 956 have completed, and here the value smant is calculated by shifting m2 left by shift_amount plus a constant value held in b which aligns the lookups to the table exponent labels.

After step 960 and 948 have been completed, the process proceeds to step 964. At step 964 four separate look up processes (comprising steps 968-970, 972-974, 976-978, and 980-982) are initiated, which can be executed serially or in parallel. The processes use tables CT, CT2, CT3, and CT4 respectively, which are equal to CT, CT+table_size, CT+ (2*table_size) and CT+(3*table_size) respectively. The index into each of these tables correspond groups of num_bits bits (e.g. 8) from least to most significant, held within the smant value computed in step 960. Values are retrieved in 970, 974, 978, and 982 which create the four factors v1, v2, v3, and v4 in step 990. In step 990 these four values are multiplied together to create the result of exp(x), and the process then completes at step 992.

To accelerate this calculation in a computer processor, instruction sequences must be selected that can be completed together within the number of stages available in the architecture. Four such instructions are provided and described below for the parallel processing architecture described with respect to FIGS. 1-5, each of which performs the job of multiple regular instructions.

Figure 7:
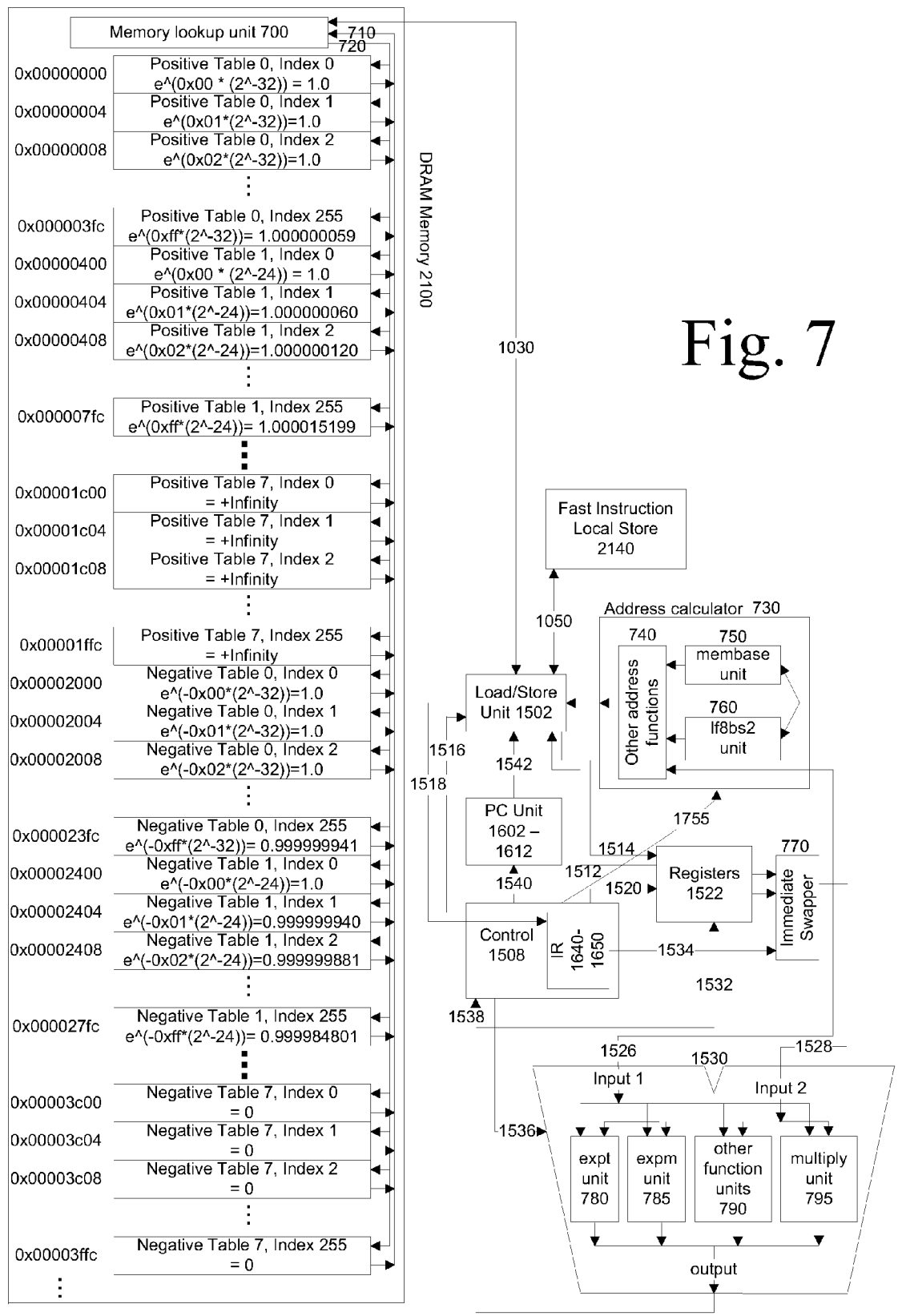
FIG. 7 is a block diagram of the parallel computing architecture of FIG. 1 with additional components performing the exponentiation function in accordance with one preferred embodiment of this invention.

FIG. 7 shows an illustrative embodiment of the parallel computing architecture of FIG. 1 with additional components 700-795 for performing the exponentiation function described above. Memory is shown for the first 16 Kilobytes (addresses 0x00000000-0x00003ffc, and the ellipsis in the bottom left corner of the figure shows that there can be additional memory in the DRAM memory 2100 beyond the first 16 kilobytes. In this example, the tables in the bottom two rows of FIG. 6 are shown in memory. Eight tables are shown for the positive set of tables (0x00000000-0x00003ffc), with each holding 1024 bytes comprising 256 indices (0-255) of 4-byte floating point values. The first positive table, Table 0, appears at the top left of the diagram under memory addresses 0x00000000-0x000003fc. The second positive table, Table 1, appears directly below Positive Table 0, under memory addresses 0x00000400-0x000007fc. The eighth positive table, Table 7, appears below the bold ellipsis underneath Positive Table 1, under memory addresses 0x00001c00-0x00001ffc. The bold ellipsis near the middle left of FIG. 8 implies that positive tables 2, 3, 4, 5, and 6 occur in a similar fashion under memory addresses 0x00000800-0x00001bfc.

Positive Table 0 holds e^x values for x in the range of $0x00*(2^{-32})$ to $0xFF*(2^{-32})$. Positive Table 1 holds values for x in the range of $0x00*(2^{-24})$ to $0xFF*(2^{-24})$. Positive Table 2, not shown, holds the same values where "−32" and "−24" are replaced by "−16". This continues until Table 7 holds values where the exponent value is "24". Thus, positive tables 0, 1, 2, 3, 4, 5, 6, 7 use y values of {-32, −24, −16, −8, 0, 8, 16, 24}.

Negative tables are almost identical to the positive tables described above, except that instead of using a range of 0x00 to 0xFF in the above equation, the range is −0x00 to −0xFF. Thus, negative Table 0 appears under memory addresses 0x00002000-0x000023fc, and holds the results of e^x for x ranging from $-0x00*(2^{-32})$ to $-0xFF*(2^{-32})$. The rest of the negative tables proceed similarly to the positive tables. We can see that positive Table 7 represents values raising e to very high positive values, resulting in positive infinity representations. In contrast, Negative Table 7 represents values raising e to very large negative values, resulting in zero values.

Still referring to FIG. 7, the Memory lookup unit 700 initiates retrieval of table values via the outgoing fetch request 720. The memory value is then sent back to the memory lookup unit 700. These incoming fetch results which are communicated from the data in memory to the memory lookup unit via 710. Similarly to FIG. 1, the address, data, and read/write option are communicated between the Load/Store unit 1502 and the DRAM memory 2100 through the 1030 communication channel.

FIG. 7 also shows a special address calculator 730 which includes a membase unit 750, lf8bs2 unit 760, and other address function unit 740. The membase unit 750 adds a stored value to the data received from the immediate swapper 770. The membase unit 750 is instructed when to update its stored adding value by the control unit 1508 via pathway 1755. When signaled by the control unit 1508 the membase unit 750 updates an internal memory using the value received by the Immediate swapper 770. When executing multiple virtual processors, the membase unit 750 may use separate addition values for each separate virtual processor. In this way membase unit 750 will add different values depending on what virtual processor it is functioning for during a given cycle. The lf8bs2 unit 760 performs the operation described below, which shifts the incoming value from the immediate swapper 770 to the left two bits, and masks with 0x3FF such that the input value becomes an index into a 1024-byte table holding 256 4-byte entries. The output is then passed to the Other address functions unit 740. The other address functions units 740 can perform various functions such as remapping of addresses that would be in region A to a different region B of the same size. Of note is the addition of the value output from lf8bs2 unit 760 and the membase value retrieved from the membase unit 750.

The ALU 1530 holds four units including the expt unit 780, expm unit 785, other function units 790, and the multiply unit 795. The expt unit 780 and expm unit 785 perform as described below. The other function units 790 performs other ALU functions not specifically described here for brevity, but are typical of software processor ALUs. The multiply unit 795 is a typical unit, but is shown here explicitly for completeness. The multiply unit multiplies the input 1 by input 2 and provides the results as output.

The immediate swapper unit 770 may be implemented explicitly as shown in FIG. 7. In alternative embodiments, swaps may be done in various points throughout the system and the immediate swapper unit 770 may not be present. The immediate swapper unit 770 is directed by the control unit 1508 via channel 1534, which provides any immediate values that are stored within the instruction data. When the control unit 1508 instructs it to do so, the immediate swapper 770 replaces either Input 1526 or Input 2 1528 with the immediate value. These input values are not only passed to the ALU 1530, but also to the address calculator 730, which receives data from input 1 directly to the other address functions unit 740. On this way the address may be calculated adding a membase value, lf8bs2 value, and immediate value, all summed together within 740 and sent to the Load/Store Unit 1502 for reading or writing of data to memory 2100. The four special instructions (e.g., expt, expm, membase and lf8bs2) are used to implement portions of the functionality of the exponentiation function so that fewer compute cycles are required to carry out the calculation.

Custom Instruction High Level Description

Expt Unit 780

The expt unit 780 implements the "expt" instruction, which calculates the index of the first table that will be used in the exponentiation function. Although four tables are used to perform the exponentiation, only the first requires this special instruction, as the following three tables are adjacent in memory. The table index is then shifted left 10 by the expt unit (same as multiplying by 1024) to accommodate the width of the tables. Max and min functions are built-into the expt unit 780, as described in detail in the custom instruction details section.

Figure 10:
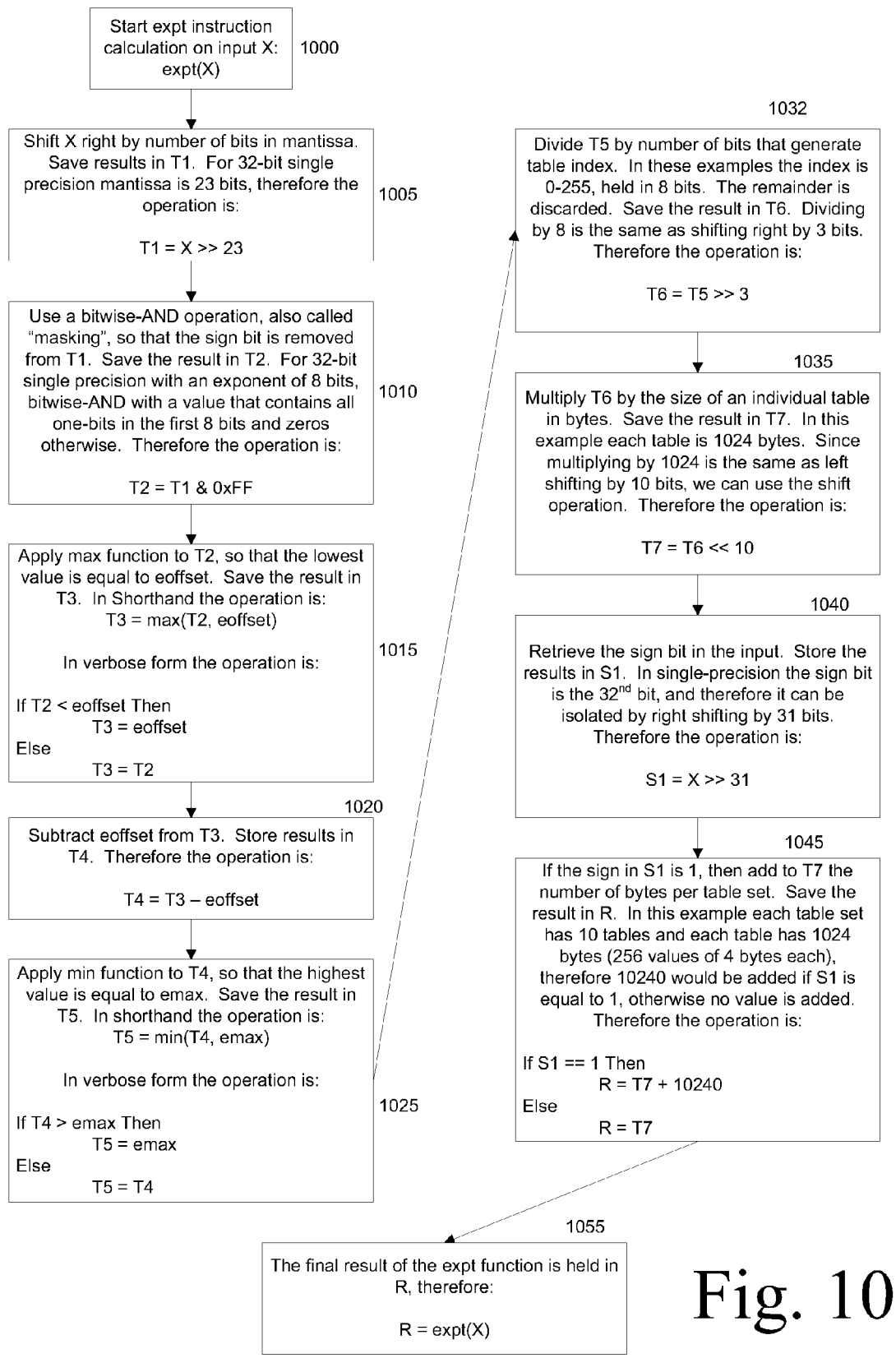
FIG. 10 is a flow chart illustrating steps by which the expt instruction calculates its result in accordance with one preferred embodiment of this invention.

In FIG. 10 the process by which the expt instruction calculates its result from its input is described. The process begins in step 1000 on receiving an input X and immediately proceeds to step 1005. Step 1005 specifies that X is to be shifted right by the number of bits in the mantissa. This is because for standard floating point representations the mantissa occurs in the least significant bits, and step 1005 begins to isolate the exponent part which uses the bits above the mantissa positions. For single-precision, the mantissa is 23 bits and therefore X is shifted right by 23 bit positions, and the result is stored in variable T1. The variables that will be described in FIGS. 10-13 are hardware registers. In addition, it is possible to implement multiple steps in a single operation, or using custom operations that combine multiple logical operations in hardware. The specification here is not meant to limit the hardware implementation to these logical operations but merely serves as a logical description of the hardware.

After step 1005 the process proceeds to step 1010 wherein the bitwise-AND operation is used for "masking". This operation forces some of the bits to zero based on their position. In this example the first 8 bits of T1 are preserved because the exponent is 8 bits. Therefore the AND operation is performed on the value T1 using a second value 0xFF which allows the first 8 bits to remain at their values in T1, and all other bits are forced to zeros. The result is stored in variable T2.

Next, at step 1015, a "max" function is performed on the exponent T2 previously derived in step 1010. The max operation provides a lower bound on the value T2 and stores the result in T3. The lower bound is a constant value named eoffset. The process by which eoffset can be optimally derived is described in FIG. 14. Thus, T3 is equal to T2 unless T2 is less than eoffset, in which case T3 is equal to eoffset. In step 1020 the value eoffset is subtracted from T3 and stored in T4. At step 1025 the min function is used, which provides an upper bound on the variable T4 and saves the result in T5. The upper bound is the value emax, and the process by which emax can be optimally derived is described in FIG. 15. Thus T5 is set to T4 unless T4 is greater than emax, in which case T5 is set to emax.

Next, in step 1032 T5 is divided by the number of bits used in the table lookups. In the examples previously shown, each table has 256 entries which uses 8-bits to specify an index. The remainder is discarded and the result is stored in variable T6. Because dividing by 8 and discarding the remainder is the same as right shifting by 3, the right shift operation can be used. (Note that in hardware a right shift is the same as simply deleting some of the least significant bits. The hardware logic used to derive the lower bits can also be discarded, thereby reducing the size of the hardware design, lowering its cost, and/or reducing its power consumption).

In step 1035 T6 is multiplied by the number of bytes used in an individual table. In the previous examples each table holds 256 entries of 4 bytes each. Thus, T6 is multiplied by 1024. Multiplying by 1024 is the same as left shifting by 10 bits so the left shift operation can be used instead of the multiplication and T7 holds the value T6 left shifted by 10 bits.

In step 1040 the sign bit of X is isolated and saved in S1. In single precision the sign bit is stored in the $32^{nd}$ bit position so S1 receives the value of X right shifted by 31 bits. In step 1045 the sign is tested and based on the result a value is stored in R.

If S1 is equal to 1 then R is set to T7 plus the number of bytes in a table set. Recall that there are two table sets, one positive and one negative. In this example each table set has 10 tables of 1024 bytes each, and therefore when S1 is equal to 1 the value R receives the sum of T7 and 10240. If S1 is not equal to 1 then R receives the value of T7. In step 1055 the result of the expt(X) function is designated as R. The R value was derived in step 1045. This value will be stored in a hardware register as defined by the parameters stored in the encoding of the expt instruction.

Expm Unit 785

The expm unit 785 implements the "expm" instruction, which takes the bottom 23 bits (the "fraction" part), inserts the implied 1-bit at the 24'th bit, enters zeroes where the exponent and sign bit are, and then performs a left-shift based on the exponent mod 8 (the remainder when the exponent value is divided by 8). The fraction part is shifted left one additional place so that when the maximum remainder is present (a value of 7), the shift is 8 places to the left, causing the implied bit to be at bit 32, and the least significant bit of the fraction at bit 9, and bits 1-8 are blank. In the case that the remainder is zero, then a left shift of 1 is performed so that bits 32-26 are zero, bits 25-2 contain the fraction, and bit 1 is zero.

Figure 11:
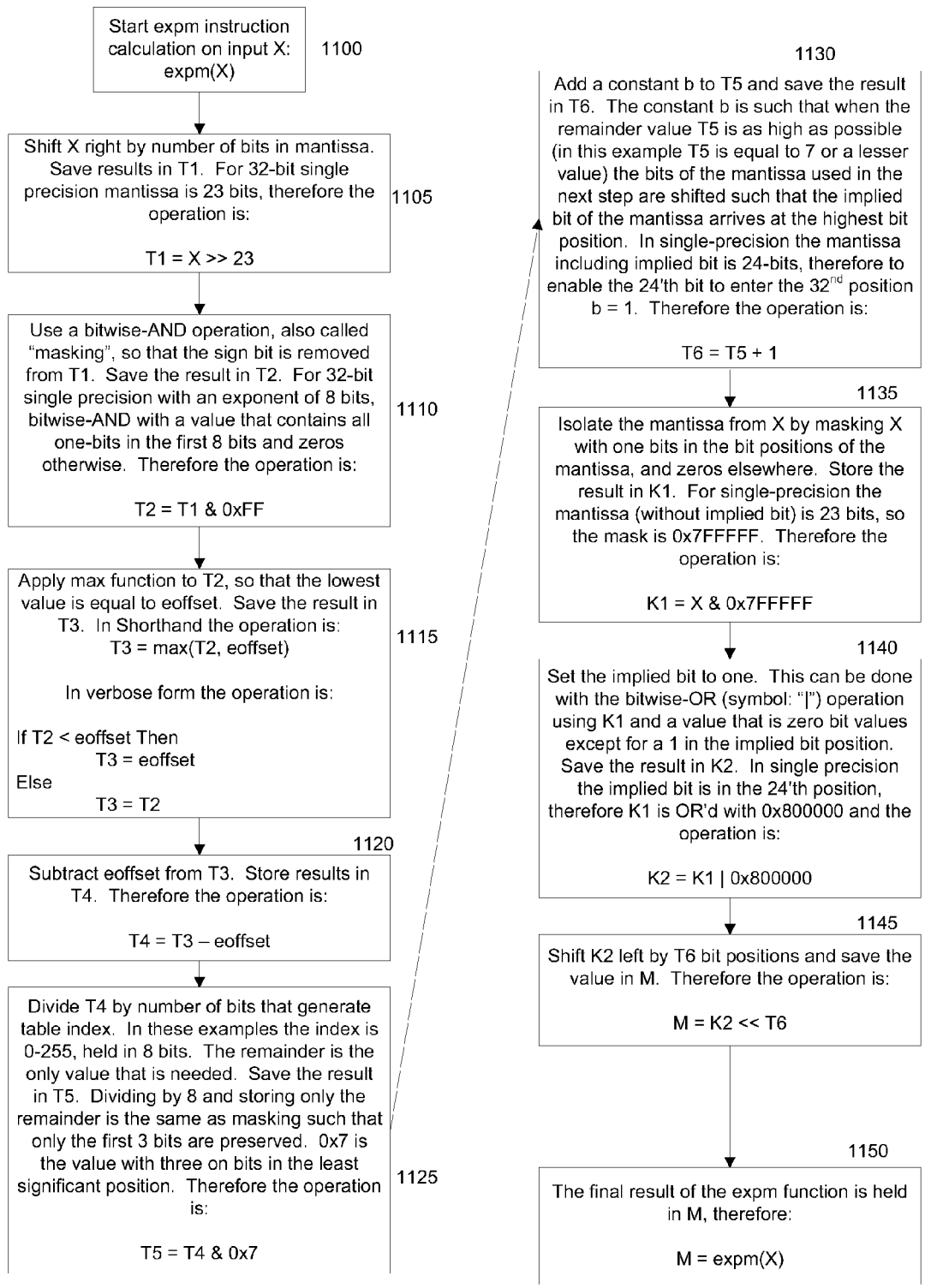
FIG. 11 is a flow chart illustrating steps by which the expm instruction calculates its result in accordance with one preferred embodiment of this invention.
Figure 12:
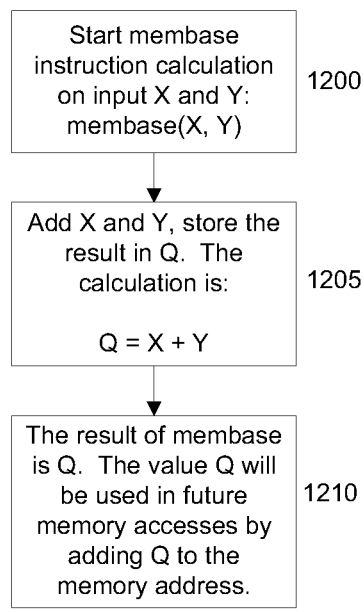
FIG. 12 is a flow chart illustrating steps by which the membase instruction calculates its result in accordance with one preferred embodiment of this invention.
Figure 13:
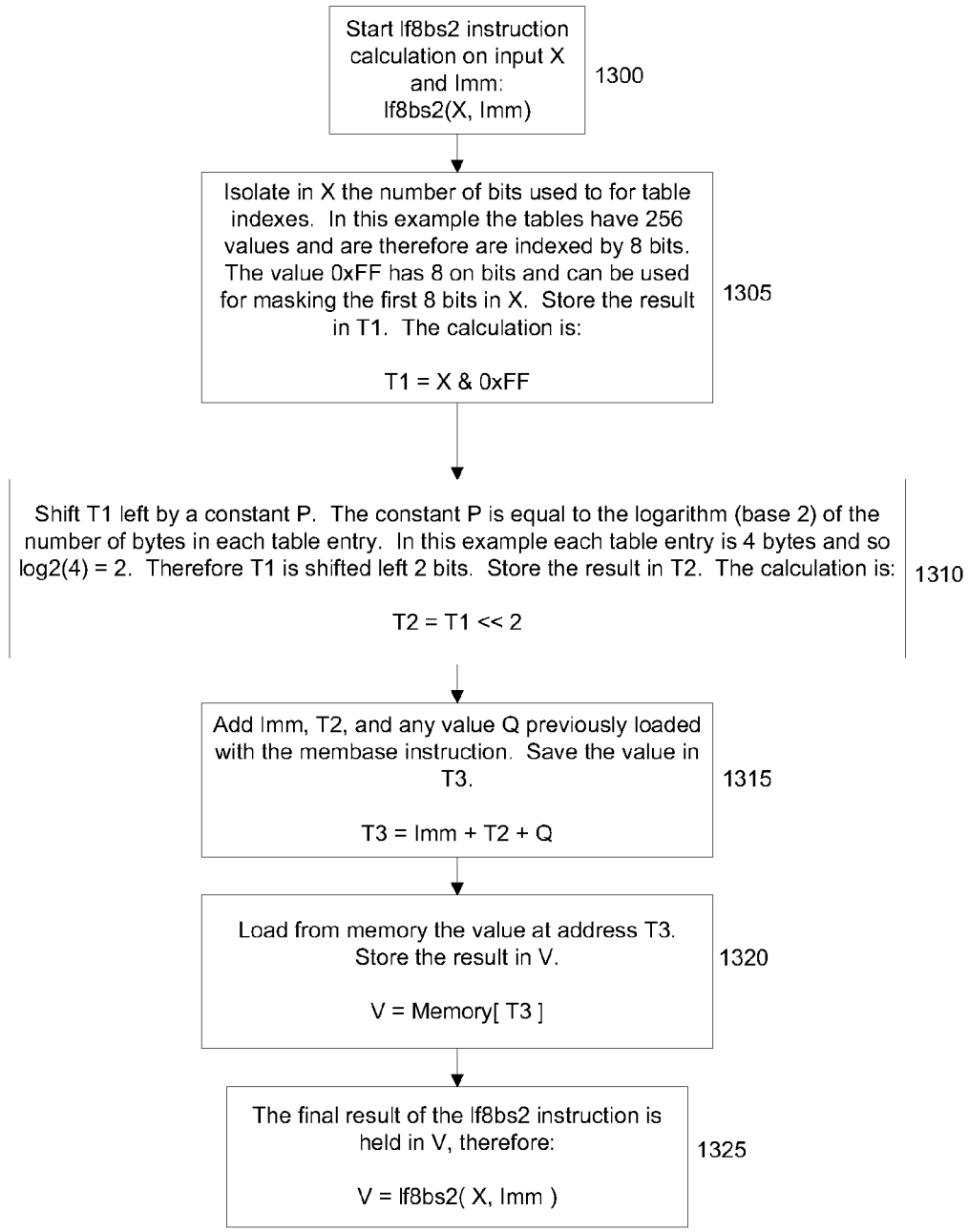
FIG. 13 is a flow chart illustrating steps by which the lf8bs2 instruction calculates its result in accordance with one preferred embodiment of this invention.

Referring to FIG. 11, the process by which the expm instruction calculates its result from its input is described. The process begins in step 1100 which immediately proceeds to step 1105. Step 1105 specifies that X is to be shifted right by the number of bits in the mantissa. This is because for standard floating point representations the mantissa occurs in the least significant bits, and step 1105 begins to isolate the exponent part which uses the bits above the mantissa positions. For single-precision the mantissa is 23 bits, and therefore X is shifted right by 23 bit positions, and the result is stored in variable T1. The variables that will be described in FIGS. 11-13 are in fact hardware registers. In addition, it is possible to implement multiple steps in a single operation, or using custom operations that combine multiple logical operations in hardware. This description is not meant to limit the hardware implementation to these logical operations, but instead serves as a logical description of the hardware.

After step 1105 the process proceeds to step 1110 wherein the bitwise-AND operation is used for "masking". This operation forces some of the bits to zero based on their position. In this example the first 8 bits of T1 are preserved because the exponent is 8 bits. Therefore the AND operation is performed on the value T1 using a second value 0xFF which allows the first 8 bits to remain at their values in T1, and all other bits are forced to zeros. The result is stored in variable T2.

The next step is 1115, and in this step a "max" function is performed on the exponent T2 previously derived in step 1110. The max operation provides a lower bound on the value T2 and stores the result in T3. The lower bound is a constant value named eoffset. The process by which eoffset can be optimally derived is described in FIG. 14. Thus, T3 is equal to T2 unless T2 is less than eoffset, in which case T3 is equal to eoffset. In step 1120 the value eoffset is subtracted from T3 and stored in T4. In step 1125 T4 is divided by the number of bits that generate a table index. In these examples the table index has been a value of 0-255 because each table holds 256 values. Thus T4 is divided by 8. Only the remainder in this calculation is used however. Calculating the remainder when dividing by 8 is the same as retrieving the three least significant bits. These bits can be retrieved by a masking operation using the value 0x7, which has one bits in the first 3 positions and zeros elsewhere. The value T5 holds the result, thus T5 is set to the value of T4 after bitwise-AND'ing with 0x7.

In step 1130 a constant b, in this case b=1, is added to T5 and stored in T6. The constant b is such that when the remainder value T5 is as high as possible (in this example T5 is equal to 7 or a lesser value) the bits of the mantissa used in the next step are shifted such that the implied bit of the mantissa arrives at the highest bit position. In single-precision the mantissa including implied bit is 24-bits, therefore to enable the 24'th bit to enter the 32nd position b=1. In step 1135 the mantissa of the input is isolated by masking (bitwise-AND) with a value that has one-bits in all the mantissa bit positions, and zeros elsewhere. In single precision the first 23 bits are mantissa and 0x7FFFFF is the value in which the first 23 bits are ones and all others are zeros. The result is stored in K1. Therefore K1 receives the value of X bitwise-AND'ed with the value 0x7FFFFF.

In step 1140 the implied bit of the mantissa is set to 1. In single precision the mantissa is 23 bits and therefore the implied bit is in position 24. The result is stored in K2. To set this value to 1 we bitwise-OR the value K1 with a value that has a one-bit in the $24^{th}$ position and zeros in all other places. 0x800000 is such a value, and therefore K2 receives the value of K1 bitwise-OR'd with 0x800000. In step 1145 the result of expm is calculated and stored in M. M receives the value of K2 shifted left by T6 bits and in step 1150 M is the result of expm(X).

Membase Unit 750

The membase unit 750 implements an instruction that stores a user-defined value into a special register that, until membase is zeroed, is added to all memory references performed by the user instructions. To perform exponentiation faster, membase can be set to the sum of the base address of the applicable table (positive or negative table set) plus the table index memory value calculated by expt. Membase may be configured to reset the base address to 0 automatically after a certain number of memory references. It is possible to implement membase such that it only adds the value to the address if certain memory operations are being used, such as only using the address for memory reads, or only for specific instructions that read memory (such as lf8bs2 described further below).

FIG. 12 shows the process followed by the membase instruction. In the first step 1200 the inputs X and Y are received. In step 1205 the inputs X and Y are added together and stored in Q. In step 1210 the value Q is stored into the membase unit such that future memory accesses add Q to the address in appropriate circumstances, such as for the next four times that an instruction lf8bs2 is executed. After a duration, membase may be configured to return Q to zero, or the program can specify membase to return to zero.

Lf8bs2 (Load Float 8-Bit Shifted Two) Unit 760

Once the fraction has been shifted by expm, the Lf8bs2 unit 760 implements an instruction that takes the bottom 8 bits (i.e. masking with & 0xFF), shifts the value left 2 (so it is used as a 4-byte index, so each value represents a different single precision floating point value). The value in memory at the address is loaded into a designated floating point register. The instruction includes an "immediate" memory offset encoded in the instruction which will be 0, 1024, 2048, and 3072 for the first through fourth table lookups respectively.

FIG. 13 shows the process followed by the lf8bs2 instruction. Step 1300 shows that lf8bs2 receives two inputs named X and Imm. The 1 mm is an "immediate" value, which is a constant value stored within the instruction. Step 1305 isolates a number of bits used to index into an exponent table, which is 8 bits in this case. Thus, the first 8 bits of X are masked and the results are stored in T1. The value 0xFF has one bits in the first 8 bit positions, and zeros in all other positions. T1 therefore receives the value of X bitwise-AND'ed with the value 0xFF.

In step 1310 T2 receives the value of T1 shifted a constant amount determined by the number of bytes in each table entry. The shift amount is the log-base-2 of the number of bytes in each table entry, and therefore when the entries are single precision values, which are four bytes, the value T1 is shifted left by 2 bit positions (log2(4)=2). The result is stored in T2. In step 1315 T2 is added with the 1 mm input, and any value Q being added by a previous membase instruction is also added. The result is stored in T3 and serves as the memory address from which a table entry will be fetched. It is possible that the address would be further modified. For example, a Translation Lookaside Buffer (TLB) might be used to implement memory pages, which translate virtual addresses into physical addresses in order to simulate a memory architecture other than that physically implemented in hardware. In this example no TLB is used. In step 1320 the relevant table entry is fetched from address T3 and stored in V. In step 1325 V is designated the result of the lf8bs2(X,Imm) instruction.

Figure 14:
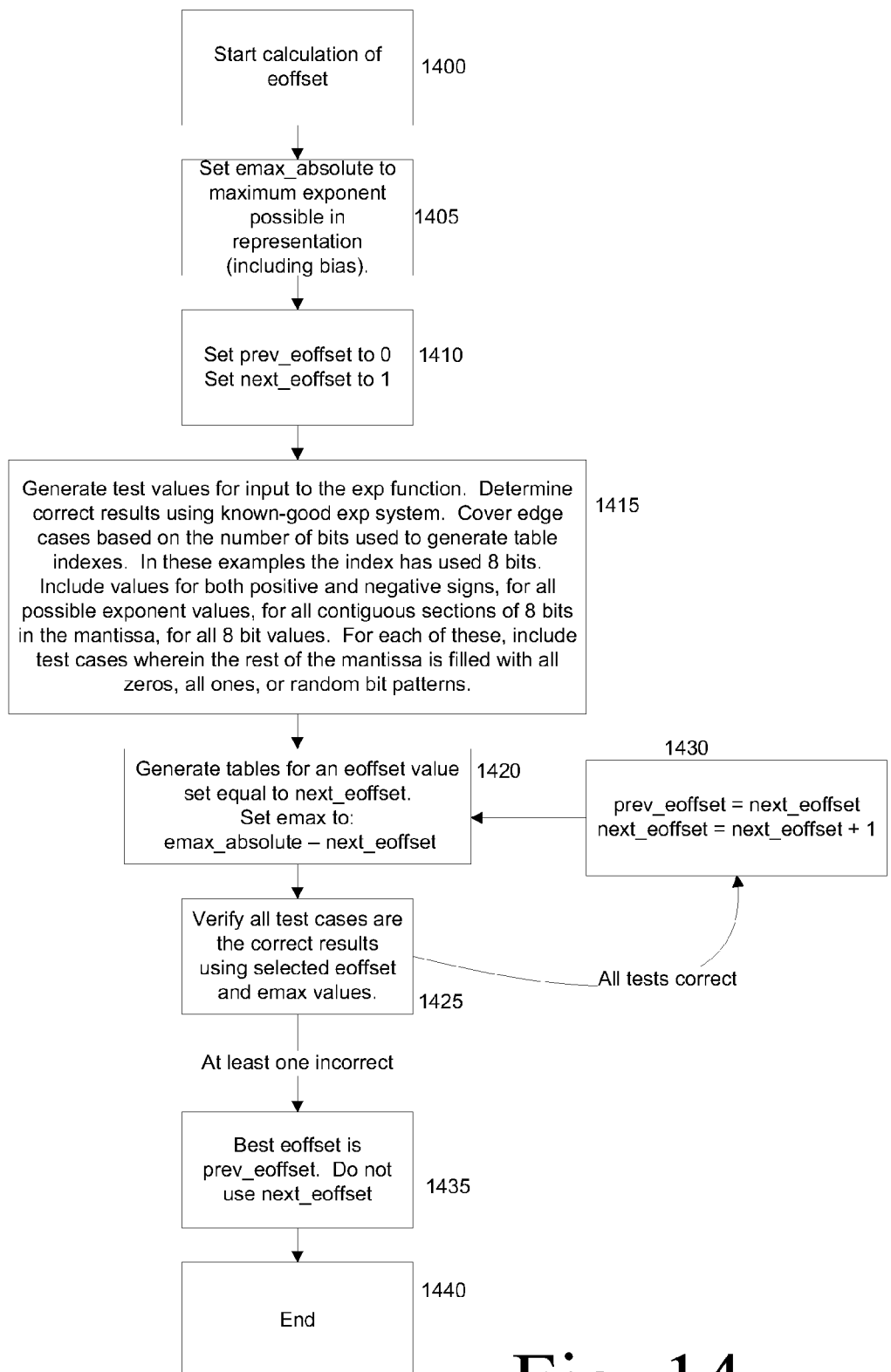
FIG. 14 is a flow chart illustrating steps for calculating an optimal eoffset value for use with the expm and expt instructions of FIGS. 10 and 11 such that the range of exponents that must be handled with tables in memory is limited in accordance with one preferred embodiment of this invention.

FIG. 14 shows a method for deriving an optimal eoffset value such that the range of exponents that must be handled with tables in memory is limited. This reduces the memory requirements for an implementation of the system. The savings can be substantial in certain circumstances. For example, if very high precision values are used with very large ranges of exponents, the number of tables required can be kept sufficiently low to implement in a power efficient system. This is achieved by using an appropriate eoffset value such that special exp function results like one, zero, and overflows, can be calculated without accessing a table that is unique to the exponent of the input.

The first step is 1400, which designates that eoffset is to be calculated. The next step is 1405, wherein emax_absolute is set to the maximum possible exponent. In single precision this value is 255. Alternatively a value of 254 can be used if the value 255 has a special meaning not meant to be directly interpreted as an exponent. In step 1410 the prev_eoffset variable is set to 0 and the next_eoffset variable is set to 1. In step 1415 a set of text input values and correct exp results are derived using a formula that likely (and in many cases guaranteed) to detect situations in which an eoffset value has been increased beyond the range that prevents accuracy loss and/or errors. The number of bits used to index the exponent tables is used to determine the test cases. In the case of single precision this value is 8. To generate the test values, all combinations of all signs (0 or 1), exponent (0-255), contiguous portion of 8 mantissa bits ({0-7, 1-8, 2-9, ... 16-23}), and combinations of 8 bits (0-255) are gone through. For each combination, multiple test cases are created, however all of the test cases for this combination share the trait of using the selected sign, exponent, and 8 bit value stored in the selected 8-bit mantissa region. Other bits of the mantissa are set to 0, 1, or random bits. Once the test inputs have been generated, a known-good method for determining the exponentiation of each test input is used to derive the correct result of each test case.

The next step is 1420, which starts a loop including steps 1425 and 1430. In step 1420 eoffset is set to next_eoffset, and emax is set to emax_absolute—next_eoffset. Furthermore, in step 1420 the relevant tables for the given selected eoffset and emax values are created and loaded into a test system. In step 1425 all of the test cases are tested on the test system. If all of the test results come back correct then step 1430 is proceeded to, otherwise step 1435 is proceeded to. In step 1435 the optimal eoffset value has been determined as the prev_eoffset value. This is the highest eoffset value that returned correct results for all test cases. Step 1435 proceeds to the completion of the process at step 1440. Step 1430 sets prev_eoffset to next_eoffset. In addition, next_eoffset is set to next_eoffset+1. After step 1430, step 1420 is proceeded to and the loop starts anew.

Figure 15:
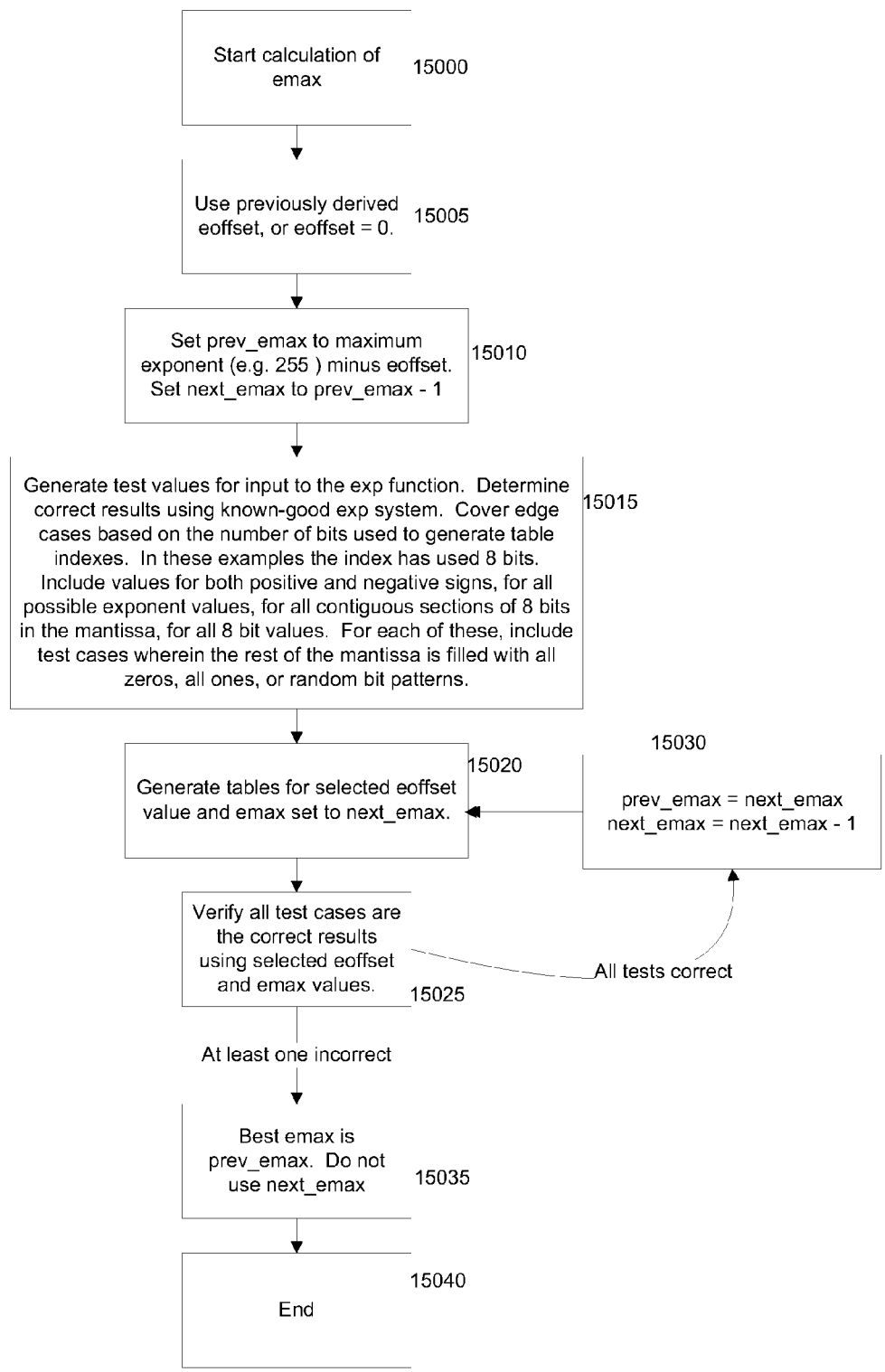
FIG. 15 is a flow chart illustrating steps for calculating an optimal emax value for use with the expt instruction of FIG. 10 in accordance with one preferred embodiment of this invention.

FIG. 15 shows the process by which an optimal emax value can be derived. The process is very similar to that shown in FIG. 14, except for the following differences. In step 15005 the eoffset value can optionally be loaded from a previous derivation such as by a previous execution of the process of FIG. 14. In step 15020 the tables are generated using an emax value that is set to next_emax. If test results in 15025 come back fully correct, step 15030 is proceeded to. In step 15030 the prev_emax value is set to next_emax, and next_emax is set to next_emax−1. In the case that an error is encountered in step 15025, step 15035 is proceeded to and the best emax value is determined as the value contained in prev_emax.

It is noteworthy that the input value of X and exponent table entries can be either 32-bit or 64-bit (or some other precision), and the number of lookups, lookup tables, bits per lookup, bytes per table entry can be adjusted, as well as the contents of the tables and the values of eoffset, b, and emax, in order to accommodate different floating point representations such as IEEE single-precision and IEEE double-precision (or even IEEE half-precision or IEEE quadruple-precision).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A non-transitory computer-readable storage medium comprising instructions, which, when executed by a processor, cause the processor to perform an automated method of exponentiation using reduced memory, the method comprising:

providing a plurality of tables, each table of the plurality of tables holding factors for obtaining results of exponentiations, wherein the plurality of tables are used to obtain the a result of a first exponentiation;

loading the plurality of tables into computer memory, each table of the plurality of tables having a plurality of the factors, wherein each factor of the plurality of the factors is a result of a second exponentiation of a constant and an exponent, the exponent being related to a memory address corresponding to the factor;

identifying a plurality of memory addresses for performing the first exponentiation by breaking up the first exponentiation into equations, results of the equations being factors of the first exponentiation, the factors of the first exponentiation being contained in the plurality of tables, wherein exponents of the equations are related to the plurality of memory addresses corresponding to the factors held in the plurality of tables;

for each exponent of the exponents of the equations:
determining whether a table corresponding to the exponent exists among the plurality of tables in the computer memory, and
in response to determining that the table corresponding to the exponent does not exist among the plurality of tables in the computer memory, modifying the exponent and determining whether a table corresponding to the modified exponent exists among the plurality of tables in the computer memory;

performing a plurality of lookups into the computer memory to retrieve the factors of the first exponentiation held in the plurality of tables corresponding to the plurality of memory addresses; and multiplying the retrieved factors together to obtain the result of the first exponentiation.

2. The computer-readable storage medium of claim 1, wherein the exponent is related to the memory address by being equal to the memory address minus a constant.

3. The computer-readable storage medium of claim 1, wherein the method further comprises reducing required compute cycles by using special instructions.

4. The computer-readable storage medium of claim 1, wherein the method further comprises implementing two or more operations of the method in a single operation using customized hardware.

5. The computer-readable storage medium of claim 1, wherein performing the plurality of lookups into the computer memory comprises performing the plurality of lookups into the computer memory in parallel.

6. A system for performing exponentiation using reduced memory, the system comprising:
  at least one memory configured to store a plurality of tables, each table of the plurality of tables holding factors for obtaining results of exponentiations, wherein the plurality of tables are used to obtain a result of a first exponentiation; and
  at least one processor configured to:
    load the plurality of tables into the at least one memory, each table of the plurality of tables having a plurality of the factors, wherein each factor of the plurality of the factors is a result of a second exponentiation of a constant and an exponent, the exponent being related to a memory address corresponding to the factor;
    identify a plurality of memory addresses for performing the first exponentiation by breaking up the first exponentiation into equations, results of the equations being factors of the first exponentiation, the factors of the first exponentiation being contained in the plurality of tables, wherein exponents of the equations are related to the plurality of memory addresses corresponding to the factors held in the plurality of tables;
    for each exponent of the exponents of the equations:
      determine whether a table corresponding to the exponent exists among the plurality of tables in the at least one memory, and
      in response to determining that the table corresponding to the exponent does not exist among the plurality of tables in the at least one memory, modify the exponent and determine whether a table corresponding to the modified exponent exists among the plurality of tables in the at least one memory;
    perform a plurality of lookups into the at least one memory to retrieve the factors of the first exponentiation held in the plurality of tables corresponding to the plurality of memory addresses; and
    multiply the retrieved factors together to obtain the result of the first exponentiation.

7. The system of claim 6, wherein the exponent is related to the memory address by being equal to the memory address minus a constant.

8. The system of claim 6, wherein the at least one processor is further configured to reduce required compute cycles by using special instructions.

9. The system of claim 6, wherein the at least one processor is further configured to implement two or more operations of the exponentiation in a single operation using customized hardware.

10. The system of claim 6, further comprising a parallel processing architecture, wherein the at least one processor is configured to perform the plurality of lookups into the at least one memory by performing the plurality of lookups into the at least one memory in parallel.

* * * * *